US007783421B2

(12) United States Patent
Arai et al.

(10) Patent No.: US 7,783,421 B2
(45) Date of Patent: Aug. 24, 2010

(54) NAVIGATION DEVICE, NAVIGATION METHOD, NAVIGATION PROGRAM, SERVER DEVICE, AND NAVIGATION INFORMATION DISTRIBUTION SYSTEM

(75) Inventors: Toshifumi Arai, Hitachi (JP); Michio Morioka, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1051 days.

(21) Appl. No.: 11/356,278

(22) Filed: Feb. 17, 2006

(65) Prior Publication Data
US 2007/0032949 A1 Feb. 8, 2007

(30) Foreign Application Priority Data
Mar. 22, 2005 (JP) ............................. 2005-082546

(51) Int. Cl.
*G01C 21/30* (2006.01)
(52) U.S. Cl. .................. 701/211; 701/200; 701/207; 701/208; 701/209; 701/210; 340/995.1; 340/995.14; 340/995.26; 340/988; 340/990; 342/357.07; 342/357.09; 342/357.1; 342/357.13; 455/404.1; 455/404.2
(58) Field of Classification Search ............... 701/211, 701/200, 207, 208
See application file for complete search history.

(56) References Cited

U.S. PATENT DOCUMENTS

| 6,049,753 | A  | * | 4/2000  | Nimura ...................... 701/201 |
| 6,263,276 | B1 | * | 7/2001  | Yokoyama et al. ............ 701/207 |
| 6,636,805 | B1 | * | 10/2003 | Tada et al. ................... 701/209 |
| 6,639,550 | B2 | * | 10/2003 | Knockeart et al. ........ 342/357.13 |
| 6,707,421 | B1 | * | 3/2004  | Drury et al. ............... 342/357.1 |
| 6,784,832 | B2 | * | 8/2004  | Knockeart et al. ........ 342/357.13 |
| 6,999,875 | B2 | * | 2/2006  | Tu .............................. 701/211 |
| 7,164,987 | B2 | * | 1/2007  | Watanabe et al. ............ 701/208 |
| 2001/0020211 | A1 | * | 9/2001 | Takayama et al. ........... 701/200 |

(Continued)

FOREIGN PATENT DOCUMENTS

CN          1209596          3/1999

(Continued)

OTHER PUBLICATIONS

Office Action of corresponding Japanese Application No. 2005-082546 dated Oct. 13, 2009.

*Primary Examiner*—Khoi Tran
*Assistant Examiner*—Jonathan Sample
(74) *Attorney, Agent, or Firm*—Crowell & Moring LLP

(57) ABSTRACT

A navigation device includes a navigation information storage unit in which navigation information, including the user-provided data, is stored; and a human machine interface unit that outputs the user-provided data and navigation information other than the user-provided data separately on an output device, that displays a warning message, read from the navigation information storage unit, and a screen prompting for an input for selecting whether to perform navigation processing based on the user-provided data when an instruction for performing navigation processing based on the user-provided data is input from an input device, and that causes a control unit, which performs navigation processing, to perform navigation processing based on the user-provided data when an instruction for performing navigation processing based on the user-provided data is input from the input device. In this way, a navigation system where user-provided data and official data are reliably combined can be provided.

9 Claims, 14 Drawing Sheets

U.S. PATENT DOCUMENTS

| | | | |
|---|---|---|---|
| 2003/0083806 A1* | 5/2003 | Odinak et al. | 701/202 |
| 2003/0200259 A1* | 10/2003 | Tsuge | 709/203 |
| 2004/0088106 A1* | 5/2004 | Omi | 701/200 |
| 2004/0104842 A1* | 6/2004 | Drury et al. | 342/357.13 |
| 2004/0193347 A1* | 9/2004 | Harumoto et al. | 701/45 |
| 2004/0243306 A1* | 12/2004 | Han | 701/211 |
| 2005/0004755 A1 | 1/2005 | Ogura | |
| 2005/0027436 A1 | 2/2005 | Yoshikawa et al. | |
| 2005/0085954 A1* | 4/2005 | Isaji et al. | 701/1 |
| 2005/0137792 A1* | 6/2005 | Tsuge | 701/209 |
| 2005/0164673 A1* | 7/2005 | Ehlers | 455/404.1 |
| 2005/0228553 A1* | 10/2005 | Tryon | 701/22 |
| 2006/0058943 A1* | 3/2006 | Pascual et al. | 701/200 |
| 2006/0173613 A1* | 8/2006 | Iwahori | 701/208 |
| 2006/0173614 A1* | 8/2006 | Nomura | 701/210 |
| 2006/0190173 A1 | 8/2006 | Ogura | |

FOREIGN PATENT DOCUMENTS

| | | |
|---|---|---|
| JP | 9-292252 | 11/1997 |
| JP | 2001-050769 | 2/2001 |
| JP | 2002054934(A) | 2/2002 |
| JP | 2003294460(A) | 10/2003 |
| JP | 2003296348(A) | 10/2003 |
| JP | 2003-316686 A | 11/2003 |

* cited by examiner

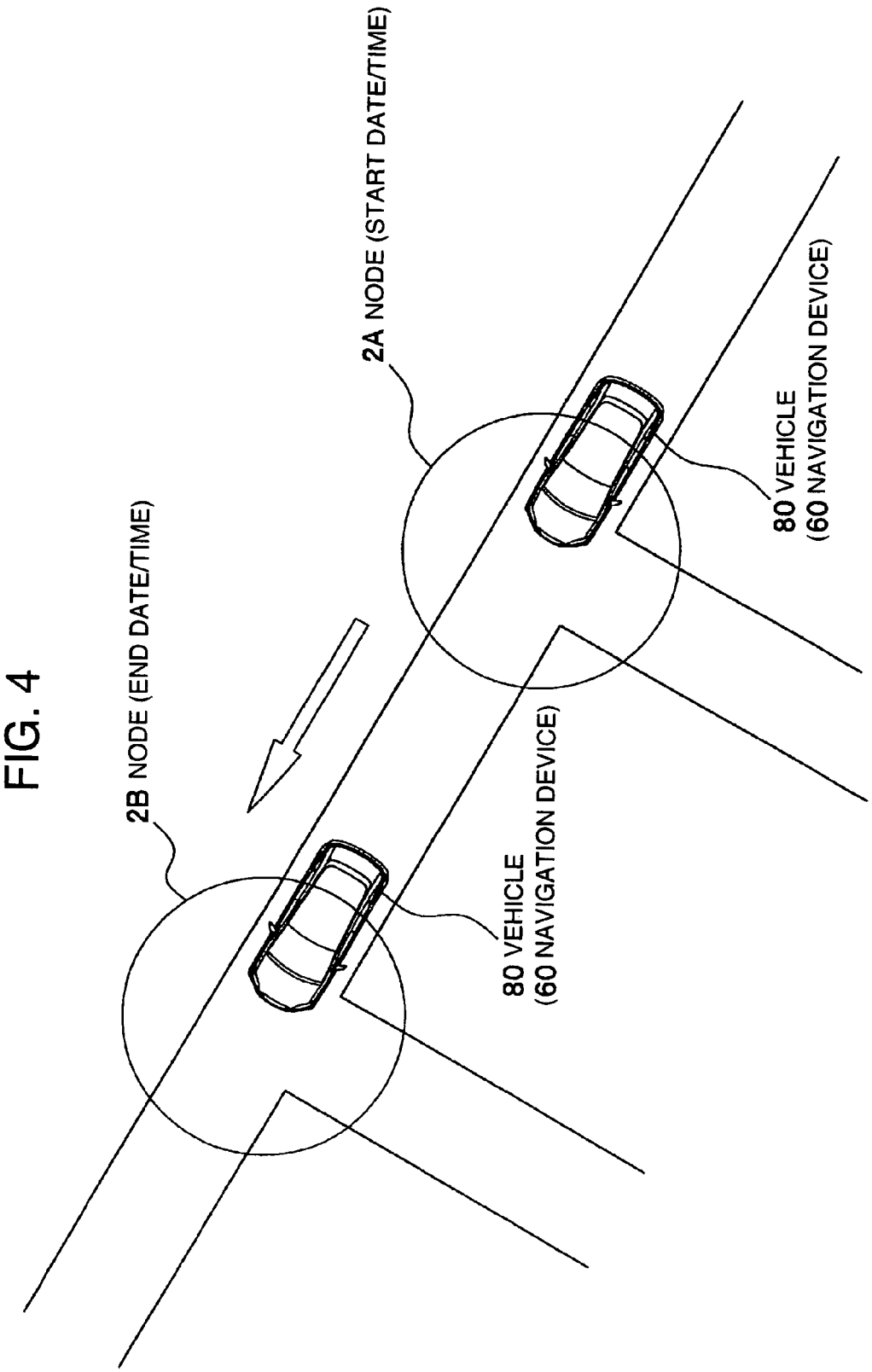

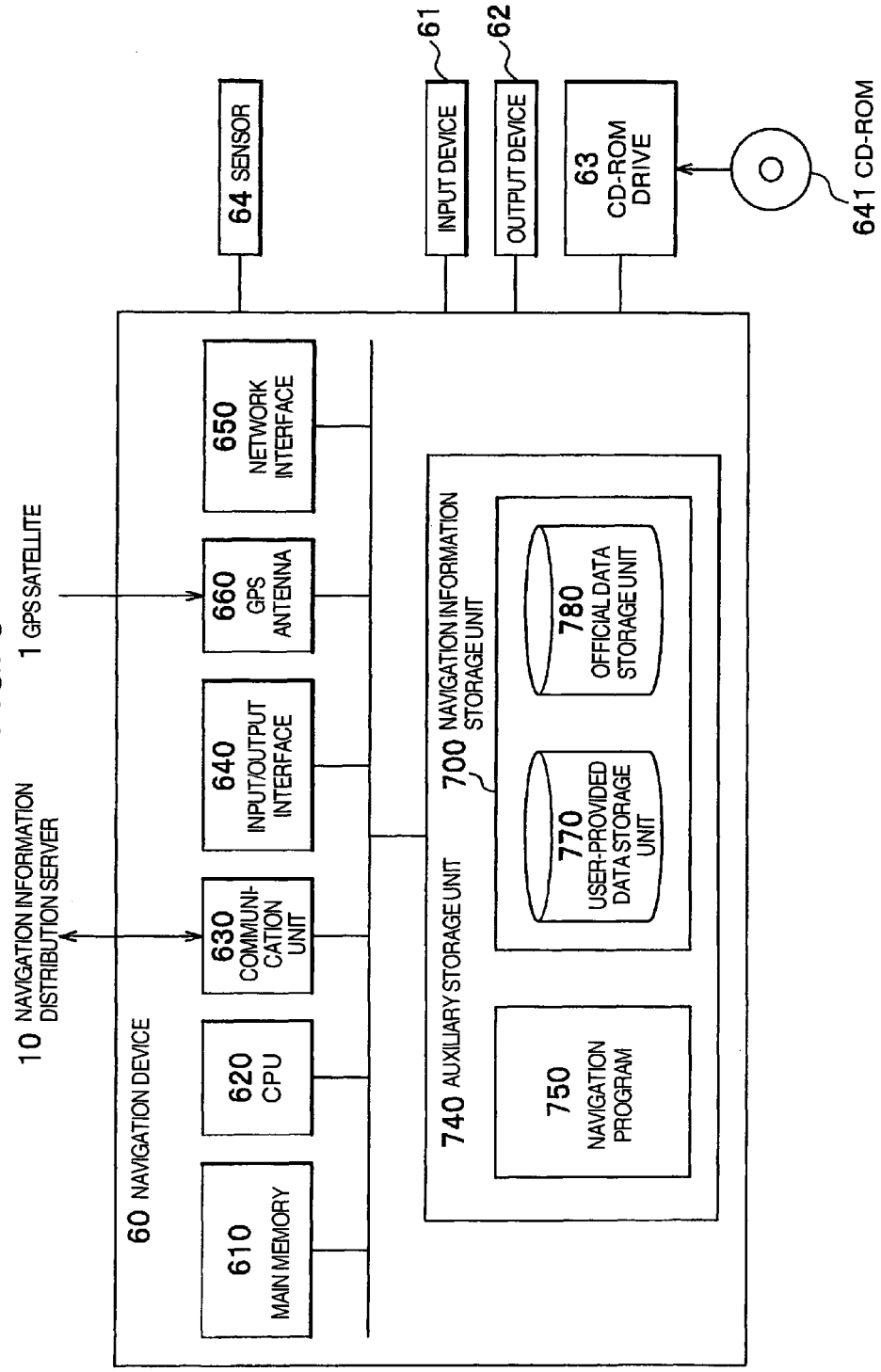

FIG. 9

| NAVIGATION FUNCTION | INCONVENIENCE THAT MAY BE GENERATED BY USING USER-PROVIDED DATA | EXAMPLE OF WARNING MESSAGE, EXAMPLE OF DISPLAY |
|---|---|---|
| MAP DISPLAY | • A NON-EXISTING ROAD OR POI IS INCLUDED<br>• THE POSITION OF A ROAD OR A POI IS DIFFERENT FROM THE ACTUAL POSITION | • USER-PROVIDED DATA SOMETIMES SHOWS A NON-EXISTING ROAD OR POI OR SHOWS A POSITION DIFFERENT FROM THE ACTUAL POSITION<br>• A ROAD OR A POI BASED ON USER-PROVIDED DATA SHOULD BE DISPLAYED IN A FORM DISTINGUISHABLE FROM OTHER DATA |
| DESTINATION SETTING | • THE DESTINATION DOES NOT ACTUALLY EXIST<br>• THE POSITION OF A DESTINATION OR A POI IS DIFFERENT FROM THE ACTUAL POSITION | • IF A POI BASED ON USER-PROVIDED DATA IS SET AS A DESTINATION, THERE IS SOMETIMES A RISK THAT THE POI DOES NOT ACTUALLY EXIST OR A DESTINATION DIFFERENT FROM THE ACTUAL DESTINATION IS SET |
| ROUTE CALCULATION | • A NON-EXISTING ROAD IS INCLUDED IN THE ROUTE<br>• THE POSITION OF A ROAD INCLUDED IN THE ROUTE IS DIFFERENT FROM THE ACTUAL POSITION | • IF USER-PROVIDED DATA IS USED FOR ROUTE CALCULATION, THERE IS SOMETIMES A RISK THAT A NON-EXISTING ROAD IS USED IN THE ROUTE OR THE POSITION OF A ROAD USED IN THE ROUTE IS DIFFERENT FROM THE ACTUAL POSITION |
| ROUTE GUIDE | • NO GUIDING LANDMARK EXISTS<br>• AN INCORRECT GUIDE IS OUTPUT<br>• THE POSITION OF A GUIDE DESTINATION IS DIFFERENT FROM THE ACTUAL POSITION | • IF USER-PROVIDED DATA IS USED FOR ROUTE CALCULATION, THERE IS SOMETIMES A RISK THAT THERE IS NO GUIDING LANDMARK, A GUIDE MESSAGE IS ISSUED AT AN INCORRECT TIME, A GUIDING DIRECTION IS INCORRECT, OR THE POSITION OF A GUIDE DESTINATION IS DIFFERENT FROM THE ACTUAL POSITION |

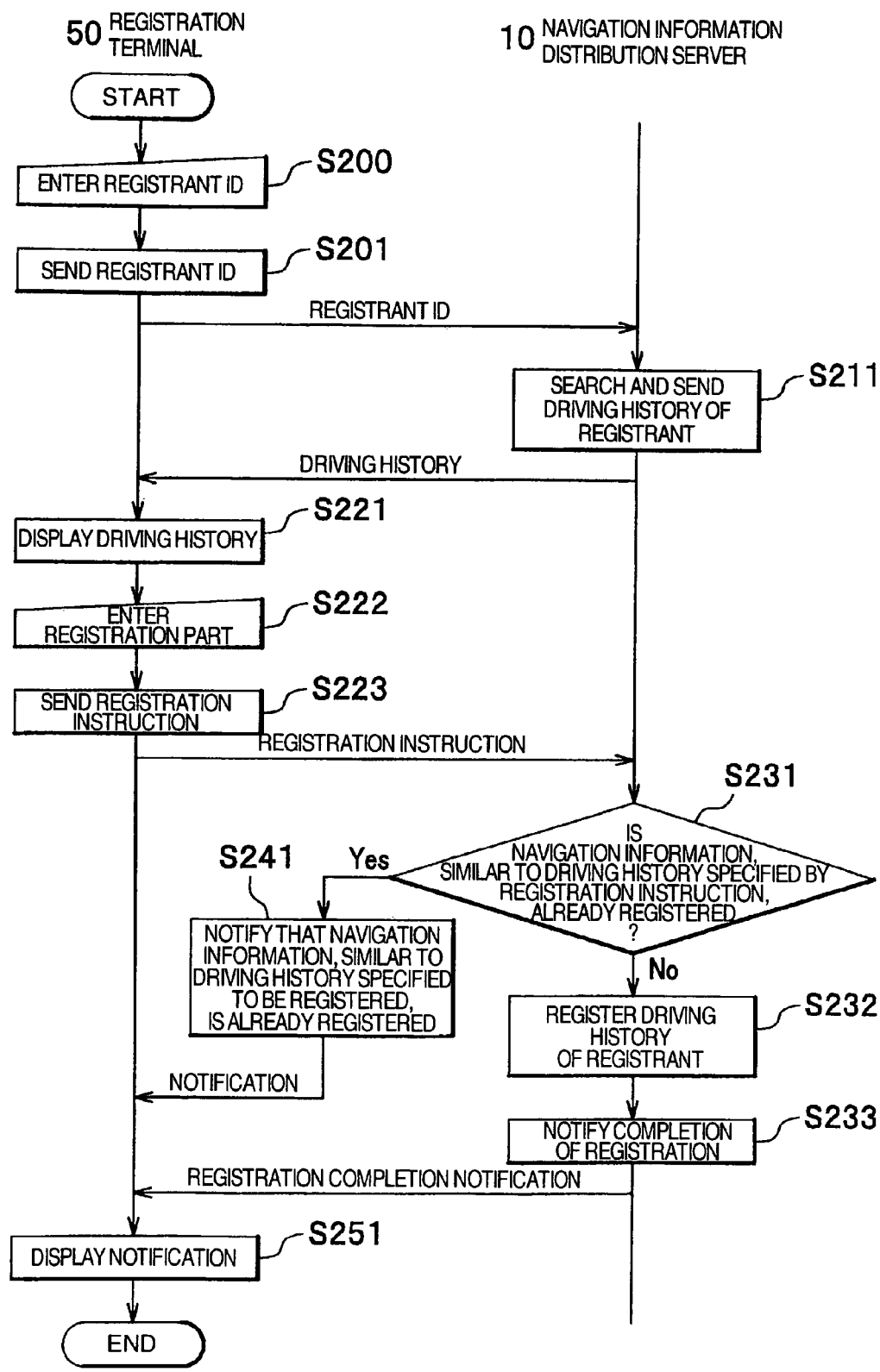

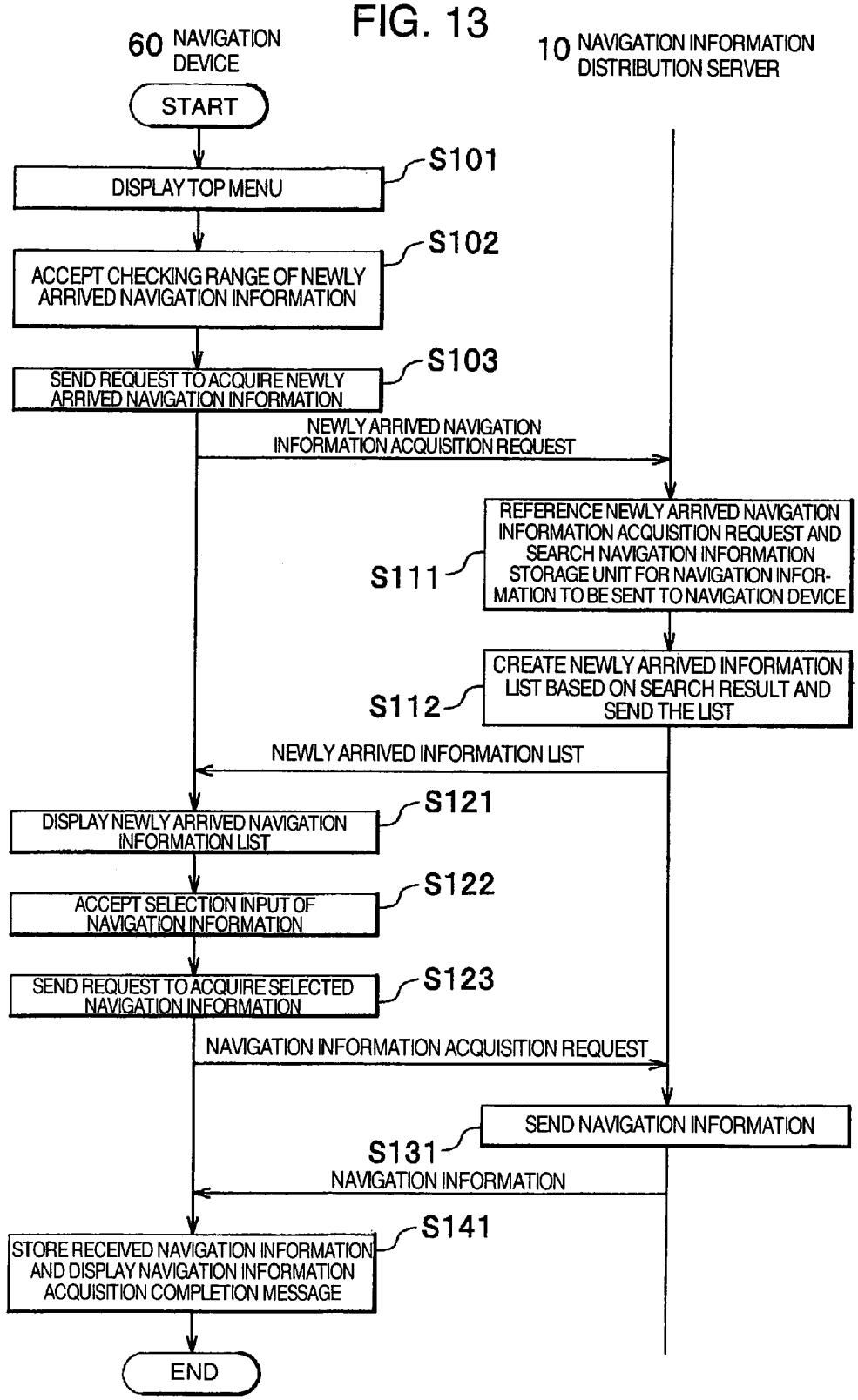

NAVIGATION DEVICE, NAVIGATION METHOD, NAVIGATION PROGRAM, SERVER DEVICE, AND NAVIGATION INFORMATION DISTRIBUTION SYSTEM

BACKGROUND OF THE INVENTION

1. Field of the Invention

The present invention relates to a navigation device, a navigation method, a navigation program, a server device, and a navigation information distribution system.

2. Description of the Related Art

Conventionally, there has been a technology for distributing the latest map information and POI (Point Of Interest) information (hereinafter called navigation information) to a navigation device to allow the navigation device, included in a mobile body such as a vehicle and a mobile phone, to navigate the user correctly.

For example, a map publisher and a navigator manufacturer (official-information supplier) investigate the onsite road status or POI status and, if there are changes in the actual roads or POI, reflect those changes as navigation information (official data). The official data on which the changes are reflected is distributed to navigation devices.

According to this technology, the changes in the roads or POI where there are many users, such as those in the city center, are reflected on the official data relatively soon; on the other hand, it takes long from the time the status of the roads or POI in the locations, where there are few users or investigators hardly visit (for example, sparsely inhabited districts or privately owned areas), is investigated to the time the investigated result is reflected on the official data.

As an enhanced version of this technology, a system allowing a navigation device user to create (update) navigation information is proposed recently as disclosed by JP-A-2003-316686.

However, there are the following problems in the existing system.

(1) User-created information is limited to simple POI information (store and building) with no consideration for the road status.

(2) Although the reliability score of POI information can be registered in the system, this reliability score is based on the distance between a position where the user provides the POI information and the POI. That is, the user tends to give a higher reliability score if the distance between the position where the user provides the POI information and the POI is shorter. The reliability score is not calculated from various aspects such as how often the user (how many users) passed near the POI.

(3) The user does not check if the navigation information is official data or user-provided data before entering a navigation processing instruction into the navigation device or giving an instruction to download data from the server. That is, there is a possibility that the user executes navigation processing on a navigation device without considering an inconvenience that might be caused by using user-provided data.

SUMMARY OF THE INVENTION

The present invention solves the problem described above. More specifically, the present invention provides a navigation device that allows the user to reliably combine user-provided data with official data To solve the problem described above, the present invention provides a navigation device to which a display device and an input device are connected and which performs navigation processing using user-provided data that is navigation information created based on a driving history of user's vehicle. The navigation device comprises a navigation information storage unit in which navigation information, including the user-provided data, is stored; and a control unit that displays the user-provided data and navigation information other than the user-provided data separately on the display device, that displays a warning message, read from the navigation information storage unit, and a screen prompting for an input for selecting whether to perform navigation processing based on the user-provided data when an instruction for performing navigation processing based on the user-provided data is input from the input device, and that performs navigation processing based on the user-provided data when an instruction for performing navigation processing based on the user-provided data is input from the input device. The warning message described above indicates, for each navigation processing based on the user-provided data, an inconvenience that might be generated by the navigation processing. Other configurations will be described later in the description of the embodiment.

The navigation device according to the present invention enables a user to check if the navigation information is user-provided data or official data and to confirm an inconvenience, which might be generated when using user-provided data, before using the user-provided data. This allows navigator manufacturers to clearly indicate the scope of responsibility on the navigator manufacturers and the scope of responsibility on the user.

The server device, which creates navigation information based on the driving history of user's vehicle, can create navigation information on the road status. In addition, even if a new road is built, the server device can quickly acquire the information to keep the navigation information up to date and enhance its contents.

In addition, the server device receives the usage result of user-provided data (driving history of driving using the user-provided data) from the navigation device and, based on the received result, updates the reliability score of the user-provided data to calculate the reliability score from the viewpoint of the usage result of user-provided data. That is, the user can learn the reliability score displayed on the display device of the navigation device that is calculated from the viewpoint that how many users (vehicles, navigation devices) used this user-provided data.

BRIEF DESCRIPTION OF THE DRAWINGS

FIG. 4 is a diagram showing the start date/time and the end date/time included in a driving history used in this embodiment.

FIG. 6 is a block diagram showing the configuration of the navigation device shown in FIG. 1.

FIG. 9 is a diagram showing a warning message output by the HMI unit shown in FIG. 7.

FIG. 10 is a flowchart showing the procedure used by the navigation information distribution server shown in FIG. 1 for creating user-provided data.

FIG. 13 is a flowchart showing the procedure used by the navigation device shown in FIG. 1 for downloading navigation information for updating from the navigation information distribution server.

DETAILED DESCRIPTION OF THE EMBODIMENTS

Figure 1:
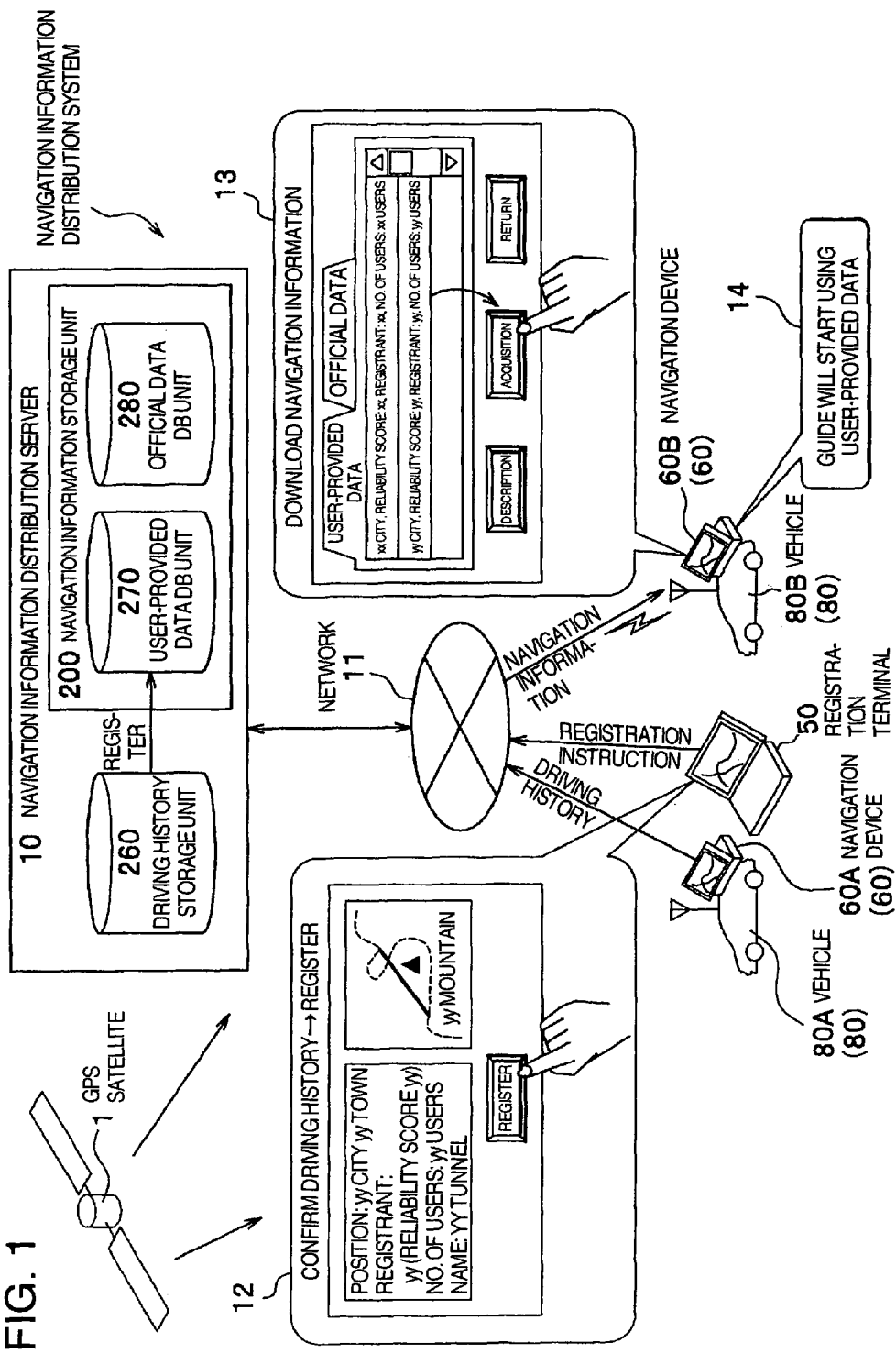
FIG. 1 is a diagram showing the general configuration of a navigation information distribution system in an embodiment.

Embodiments of the present invention will be described in detail with reference to the drawings. FIG. 1 is a diagram showing the general configuration of a navigation information distribution system in this embodiment.

The navigation information distribution system comprises a navigation information distribution server 10 that accumulates and distributes navigation information, a vehicle (registrant vehicle) 80A, a navigation device 60A that sends information such as driving routes (driving history) of the vehicle 80A to the navigation information distribution server 10, a registration terminal 50 used for entering an instruction to register the driving history of the vehicle 80A as user-provided data, a navigation device 60B used for downloading navigation information accumulated in the navigation information distribution server 10, a vehicle 80B on which the navigation device 60B is mounted, and a network 11. For example, the network 11 is a wireless communication network via which the navigation information distribution server 10, the navigation devices 60 (60A and 60B), and the registration terminal 50 are connected.

The navigation information distribution server 10 corresponds to a server device used in the claim, and the navigation device 60 corresponds to a navigation device used in the claim.

The navigation processing in this embodiment refers to the processing in which the navigation device 60 uses information received via a GPS (Global Positioning System) reception antenna to display its current position on a map on the display (display device), calculates the shortest distance to a destination that is set, or outputs information on a route guide to the destination on the route from the display or the speaker.

The navigation devices 60 (60A and 60B) are, for example, car navigation devices each comprising a GPS antenna for receiving a radio wave from a GPS satellite 1 and the function to communicate with the navigation information distribution server 10. The registration terminal 50 is a PC (Personal Computer), a PDA (Personal Digital Assistant), or a mobile phone having the function to communicate with the navigation information distribution server 10. The navigation information distribution server 10 is a computer having the function to communicate with the navigation devices 60 and the registration terminal 50. Those components will be described later in detail.

The navigation information distribution server 10 comprises a driving history storage unit 260 in which the driving history of the vehicle 80A is stored and a navigation information storage unit 200 in which navigation information is stored. The navigation information storage unit 200 comprises a user-provided data DB (database) unit 270 in which user-provided data is stored and an official data DB (database) unit 280 in which official data is stored. The navigation information storage unit 200 also stores map information created by map publishers. This map information includes node identification information (node ID) for each node of the roads. The navigation information storage unit 200 corresponds to a navigation information storage unit used in the claim.

The user-provided data is navigation information composed of road information created from the driving history of the vehicle 80A and the POI information sent by a registrant via the registration terminal 50. The official data is navigation information created by the map publishers and the navigator manufacturers (official information providers) through the investigation of the current road status or POI status. The user-provided and the official data distributed by the navigation information distribution server 10 in this embodiment are update information for updating the base navigation information (map information). That is, the navigation device 60 stores the base navigation information and receives the official data and the user-provided as the navigation information for updating.

With reference to FIG. 1, the following generally describes the procedure for registering user-provided data. The vehicle 80A sends the driving history (driving position) of the vehicle 80A from the navigation device 60A to the navigation information distribution server 10 while it is driving. This driving history is accumulated in the driving history storage unit 260 of the navigation information distribution server 10.

After the driving of the vehicle 80A is finished, the registrant operates the registration terminal 50 to access the navigation information distribution server 10 to display the driving history of the vehicle 80A, accumulated in the driving history storage unit 260, on the monitor (display device) of the registration terminal 50. The registrant confirms the driving history of the vehicle 80A on the screen of the monitor.

When the registrant wants to register the driving history in the navigation information storage unit 200 of the navigation information distribution server 10, the registrant uses the keyboard or the touch panel of the registration terminal 50 to enter an instruction to register the driving history (see a balloon 12). In response to this instruction, the registration terminal 50 sends the driving history registration request instruction to the navigation information distribution server 10.

In response to the registration request instruction from the registration terminal 50, the navigation information distribution server 10 reads the driving history of the vehicle 80A, accumulated in the driving history storage unit 260, and creates user-provided data based on this driving history. After that, the navigation information distribution server 10 registers the created user-provided data into the user-provided data DB unit 270. When creating user-provided data, the navigation information distribution server 10 attaches a flag indicating that the data is user-provided data. This flag allows the navigation information user to be aware that the information is user-provided data or official data when the user uses (downloads) navigation information.

Next, the following describes the procedure for distributing (sending) navigation information from the navigation information distribution server 10 to the navigation device 60B. In response to a navigation information distribution request (acquisition request) from the navigation device 60B, the navigation information distribution server 10 searches the navigation information storage unit 200 for the navigation information requested for distribution and sends the search result to the navigation device 60B as a list of navigation information. The list generated in this case also includes a flag indicating the type of navigation information (user-provided data or official data).

The navigation device 60B displays the received list on the monitor and accepts a navigation information selection input from the input device of the navigation device 60B. The list of navigation information displayed on the monitor is formatted based on the flag described above so that the user can identify the navigation information type (user-provided data or official data).

For example, as shown in a balloon 13, the tabs are displayed on the screen of the navigation device 60B to divide the data into two: user-provided data and the official data. When the user selects one of the tabs via the touch panel, the navigation device 60 switches the display between the user-provided data and the official data.

In response to the selection input of the navigation information via the touch panel (in the balloon 13, the user selects the User-provided data tab and then the Acquisition), the navigation device 60B sends this selection information to the navigation information distribution server 10. In response to this selection information, the navigation information distribution server 10 distributes the navigation information, requested for distribution, to the navigation device 60B. That is, the navigation information distribution server 10 requests the navigation device 60B to download the navigation information. When downloading user-provided data, the navigation device 60B also outputs a warning message notifying the user about an inconvenience that might be involved when using the user-provided data.

After that, the navigation device 60B performs navigation based on the downloaded navigation information. For example, when the navigation processing is performed based on the user-provided data, the navigation device 60B generates a voice output via the speaker before starting the navigation to indicate that the information to be used for the navigation is user-provided data (see a balloon 14). That is, before starting the navigation, the navigation device 60B outputs a warning message indicating that the information to be used for the navigation is user-provided data. Following this warning message, it is also possible to display a screen (confirmation screen) on the display device to prompt the user to select if the user wants to perform navigation using the user-provided data and, depending upon the selection input, to allow the navigation device 60 to stop the navigation using the user-provided data.

Although two navigation devices 60A and 60B (vehicles 80A and 80B) are shown in FIG. 1, one for registration and the other for downloading, for the sake of description, multiple devices may of course be used for registration or downloading. Although separate from the navigation device 60 (navigation device 60A), the registration terminal 50 may also be built in the navigation devices 60 (60A) as its part.

For each piece of user-provided data, the navigation information distribution server 10 records to which navigation device 60 each piece of data was distributed. That is, the navigation information distribution server 10 has information (usage information) on how many navigation devices 60 use each piece of user-provided data.

The navigation information distribution server 10 calculates the reliability score of user-provided data from the usage result and, when sending a list of navigation information to the navigation device 60, sends the list as well as the information on the reliability score of the user-provided data.

Sending the reliability score information as described above allows the user of the navigation device 60 to confirm the reliability score of the user-provided data before selecting the navigation information. That is, after confirming whether the reliability score of the user-provided data is high (whether the data is correct), the user can issue a download request to the navigation device 60. The calculation processing of this reliability score will be described later.

Figure 2:
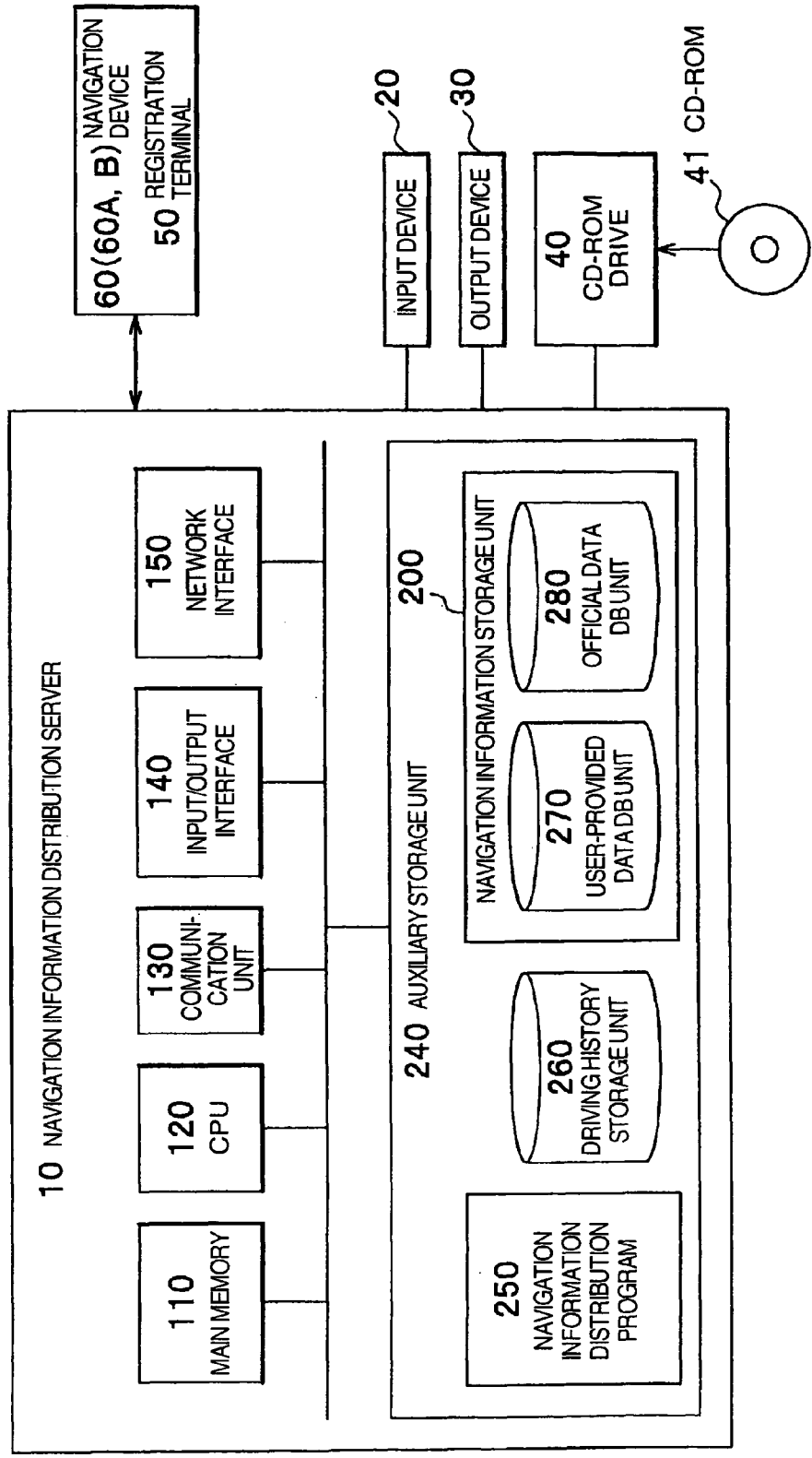
FIG. 2 is a block diagram showing the configuration of the navigation information distribution server shown in FIG. 1.

Next, referring to FIG. 1, the following describes the configuration of the navigation information distribution server 10 with reference to FIG. 2. FIG. 2 is a block diagram showing the configuration of the navigation information distribution server shown in FIG. 1.

The navigation information distribution server 10 comprises a main memory 110, a CPU (Central Processing Unit) 120, a communication unit 130, an input/output interface 140, a network interface 150, and an auxiliary storage unit 240. In addition, an input device 20 via which the operator of the navigation information distribution server 10 enters an instruction and an output device 30 via which information from the auxiliary storage unit 240 is output may also be connected to the navigation information distribution server 10. The input device 20 is, for example, a keyboard or a mouse, and the output device 30 is, for example, a liquid crystal monitor. A CD-ROM (Compact Disc Read Only Memory) drive 40 may also be connected to the navigation information distribution server 10 for sending data, stored in a CD-ROM 41, to the auxiliary storage unit 240.

The CPU 120 executes various types of calculation processing based on the program (navigation information distribution program 250) stored in the auxiliary storage unit 240. The main memory 110 is a storage area used by the CPU 120 for various types of calculation processing. The communication unit 130 sends and receives various types of information to and from the navigation devices 60 (60A and 60B) and the registration terminal 50 via the network interface 150. The input/output interface 140 is a data input/output interface with the input device 20, the output device 30, and the CD-ROM drive 40. The network interface 150 is an interface used by the communication unit 130 for communication via the network 11.

The auxiliary storage unit 240 stores the navigation information distribution program 250 in a predetermined area and has the driving history storage unit 260 and the navigation information storage unit 200. This auxiliary storage unit 240 is, for example, a hard disk device.

The navigation information distribution program 250 is a program executed by the CPU 120 for creating and registering user-provided data and for distributing navigation information to the navigation device 60B. The operation of the CPU 120 according to the navigation information distribution program 250 will be described in detail later.

For each ID of the navigation device 60, the driving history storage unit 260 holds the driving history received from the navigation device 60 and indicating the driving trace (or the driving road) of the vehicle 80. The detail of this driving history will be described later.

The navigation information storage unit 200 has the user-provided data DB unit 270 and the official data DB unit 280 in a predetermined area. The user-provided data DB unit 270 stores user-provided data for each user-provided data ID. This user-provided data is road information, POI information, and POI guide information (voice guide) created from the driving history. The official data DB unit 280 stores official data, created by the official information providers, for each official data ID. This official data is also road information, POI information, and POI guide information. The details of the user-provided data, the POI information, and the POI guide information will be described later with reference to the drawings.

Figure 3:
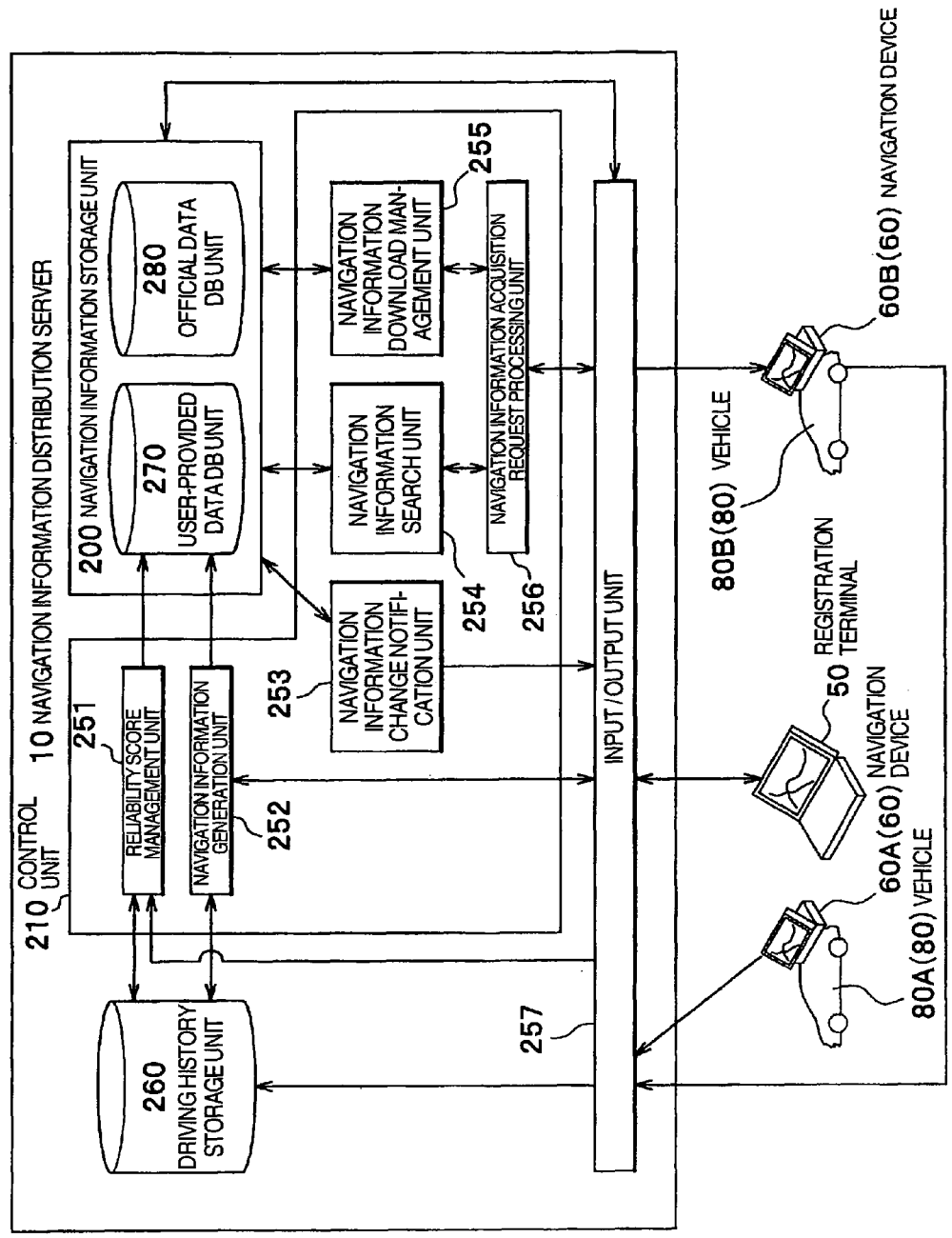
FIG. 3 is a block diagram showing the function of the navigation information distribution server shown in FIG. 1.

Next, referring to FIG. 1 and FIG. 2, the following describes the function of the navigation information distribution server 10 with reference to FIG. 3. FIG. 3 is a block diagram showing the function of the navigation information distribution server shown in FIG. 1. In FIG. 3, the input device 20, the output device 30, and the CD-ROM drive 40 shown in FIG. 2 are omitted.

As shown in FIG. 3, the navigation information distribution server 10 comprises the driving history storage unit 260, the navigation information storage unit 200, a control unit 210, and an input/output unit 257. The control unit 210 comprises a reliability score management unit 251, a navigation information generation unit 252, a navigation information change notification unit 253, a navigation information search unit 254, a navigation information download management unit 255, and a navigation information acquisition request processing unit 256.

The driving history storage unit 260 accumulates the driving history of the vehicles 80 sent from the navigation devices 60 for each ID of the navigation devices 60. This driving history is composed of the ID (navigation device ID) of the navigation device 60 from which the driving history was sent, the information on the driving road of this navigation device 60 (vehicle 80), and the user-provided data ID used by the navigation device 60 when the vehicle 80 drove this road (user-provided data usage result).

Table 1 shows an example of a driving history stored in the driving history storage unit 260.

TABLE 1

Table 1 Driving history

| | | Driving road information | | | | | User provided data result |
|---|---|---|---|---|---|---|---|
| Navigation device ID | Road ID | Start date/time | End date/time | No. of brake applications | Stopped time | Drive coordinate column | User-provided data ID |
| aaa | BBB | 01011000 | 01011010 | 4 | 10 | (xxx, yyy) ..., (aaa, bbb) | ccc |
| ... | | ... | ... | ... | ... | ... | ... |

For example, as shown in Table 1, the driving road information is composed of the items such as the ID of a road on which the vehicle 80 drove, the driving start date/time (start data/time) and driving end date/time (end date/time) on the road, the number of brake applications and the stopped time while the vehicle drove the road, and the driving coordinate string containing the position coordinates on the road on which the vehicle 80 drove. Also included in the table as the user provided data result is the ID (user-provided data ID) of navigation information used while the vehicle drove the road.

For example, the driving history exemplified in Table 1 indicates that the vehicle 80, on which the navigation device 60 having the navigation device ID "aaa" is mounted, drove the road having the road ID "bbb" and indicated by the driving coordinate string "(xxx, yyy), . . . , (aaa, bbb)" and that the driving start date/time of this road is "01011000" and the end date/time is "01011010". The table also indicates that the number of brake applications while the vehicle 80 drove this road is "4 (times)" and the stooped time is "10 (seconds)" and that the navigation device 60 used the user-provided data having the user-provided data ID "ccc" when the vehicle 80 drove this road. The driving coordinates are described by a combination of the latitude and the longitude.

The driving history, composed of such information, indicates the coordinate string of the road, the date/time at which the vehicle 80 passed through the road, and the time required for passing through the road. If the driving history indicates that the number of brake applications or the stopped time exceeds a predetermined value, there is a probability that the road is a community road.

The road ID included in the driving history is unique identification information allocated by the navigation information distribution server 10 for each link of the roads on the map stored in the navigation information storage unit 200. This road ID is an ID included in the navigation information (user-provided data and official data) downloaded by the navigation device 60.

The following describes the start date/time and the end date/time included in the driving history. FIG. 4 is a diagram showing the start date/time and the end date/time included in the driving history in this embodiment. As shown in FIG. 4, the start date/time refers to the date/time at which the vehicle 80 (navigation device 60) passes a node 2A, and the end date/time refers to a date/time at which the vehicle 80 passes the next node 2B of the road. That is, the driving history is the driving trace from one node to another. A node refers to a junction (intersection) between roads.

The navigation device 60, which will be described later, sends the driving history of the vehicle 80 to the navigation information distribution server 10 when the navigation device 60 passes a node. That is, until the vehicle 80 passes the next node 2B, the navigation device 60 stores the driving history of the vehicle 80 in itself and, when it passes the node 2B, sends the driving coordinates, recorded up to this moment, at a time.

For a road on which the vehicle 80 drives for the first time, the driving history includes a driving coordinate string beginning with the location at which a road not included in the map information in the navigation device 60 and ending with the location at which the road ends. That is, the navigation device 60 stores a driving coordinate string, beginning with the starting location of a road not included in the map information in the navigation device 60, and, when the vehicle 80 reaches the location of a road included in the map information, judges that location as the location at which the road not included in the map information ends, includes the driving coordinate string into the driving history, and sends the driving history to the navigation information distribution server 10.

As described above, the navigation information storage unit 200 has the user-provided data DB unit 270 and the official data DB unit 280 in the predetermined area. The user-provided data DB unit 270 stores road information created by the navigation information generation unit 252 based on the driving history stored in the driving history storage unit 260, POI information sent from the registration terminal 50, and guide information on the POI information.

Figure 5A:
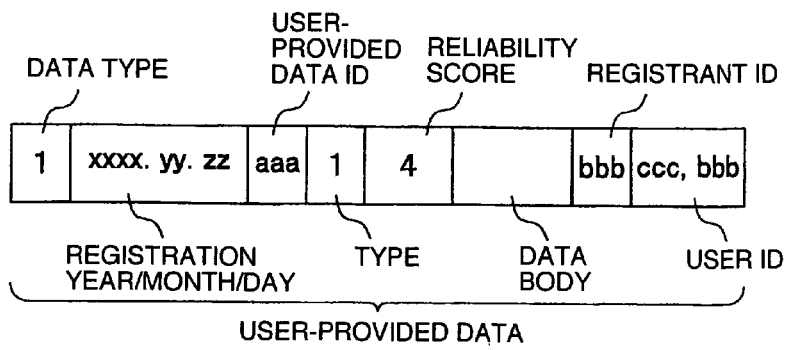
FIG. 5A is a diagram showing the configuration of user-provided data stored in a user-provided data DB unit.

FIG. 5A is a diagram showing the configuration of user-provided data stored in the user-provided data DB unit. Although only one piece of user-provided data is described here, the user-provided data DB unit 270 stores one or more pieces of user-provided data.

As shown in FIG. 5A, user-provided data is composed of the identification number of the user-provided data (user-provided data ID), the type of the user-provided data (for example, road information, POI information, guide information on POI, etc.), the reliability score of the information, the data body, the registrant ID of the user-provided data, and the user IDs of the users who used this user-provided data.

For example, FIG. 5A shows that the data type of the navigation information is "1 (user-provided data)", the registration year/month/date of the data is "xxxx.yy.zz", the user-provided data ID of the data is "aaa", the data type is "1 (road information)", the reliability score is "4", the registrant ID of this user-provided data is "bbb", and the user IDs of the users who downloaded this user-provided data are "ccc" and "bbb".

This user-provided data ID is the unique ID of each piece of user-provided data that is issued when the navigation information generation unit 252 registers the user-provided data in the user-provided data DB unit 270. This user-provided data ID may also be described with the information on the data type (indicating whether the navigation information is user-provided data or official data). Note that the reliability score is initially is "0" (when user-provided data is registered) and, when the driving history (driving result) of each vehicle 80 is added to the driving history storage unit 260, the reliability score management unit 251 (described later) updates the value of the reliability score.

This user-provided data may also include information on the road attribute indicating whether the road is a trunk road or a community road. This road attribute information is written into the user-provided data by the navigation information generation unit 252 based on the information included in the driving history such as the number of times the brake was applied, stopped time, and the time from the end date/time to the start date/time (road passage time). For example, if the passage the road requires a time longer than a predetermined time, if the number of brake applications exceeds a predetermined value, or if the stopped time is equal to or longer than a predetermined time, the navigation information generation unit 252 writes the information, indicating that the road is a community road, into the user-provided data considering those factors.

The navigation information generation unit 252 writes such information into the user-provided data to allow the navigation device 60 to calculate a route considering the road attribute of the user-provided data, for example, the navigation device 60 does not use the road information on community roads for the route calculation.

Note that the user ID column of user-provided data is initially left blank. When the navigation information distribution server 10 sends user-provided data in response to a download request from the navigation device 60, it adds the user ID of the transmission destination navigation device 60 to the user-provided data in the user-provided data DB unit 270. That is, the navigation information distribution server 10 records which user has downloaded which user-provided data.

In response to the information from the navigation device 60 indicating that the navigation device 60 has stopped the use of the user-provided data (has deleted from the navigation device 60), the navigation information distribution server 10 deletes the user ID of this navigation device 60 from the user-provided data stored in the user-provided data DB unit 270.

This allows the navigation information distribution server 10 to keep track of by which user (navigation device 60) each piece of user-provided data is currently used.

Figure 5B:
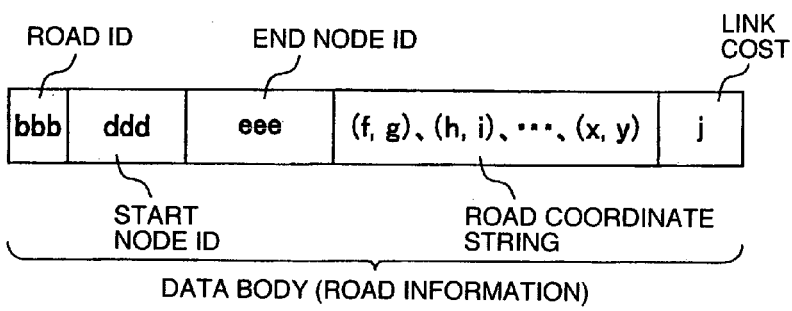
FIG. 5B is a diagram showing the configuration of the data body when the user-provided data shown in FIG. 5A is road information.
Figure 5C:
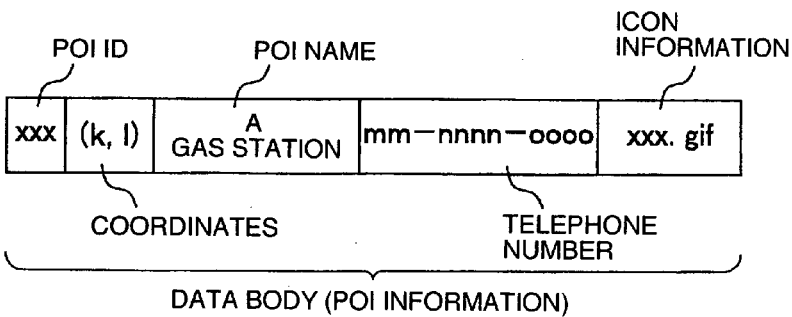
FIG. 5C is a diagram showing the configuration of the data body when the user-provided data shown in FIG. 5A is POI information.
Figure 5D:
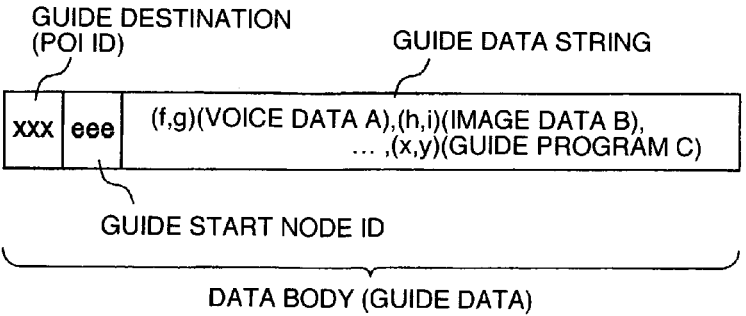
FIG. 5D is a diagram showing the configuration of the data body when the user-provided data shown in FIG. 5A is guide information.

FIGS. 5B-5D are diagrams showing the configuration of the data body of the user-provided data shown in FIG. 5A. FIG. 5B shows the configuration of the data body when the user-provided data is road information. As shown in FIG. 5B, the data body of this information comprises a road ID, the start node ID and the end node ID of the road, a road coordinate string that is a sequence of nodes from the start node to the end node, and the time (link cost) required for passing the road.

For example, the data body shown in FIG. 5B indicates that the start node of the road ID "bbb" is "ddd", the end node ID is "eee", the coordinate string of this road is "(f, g), (h, i), ... , (x, y)", and the link cost is "j (seconds)". Note that the road ID is a unique ID issued by the navigation information generation unit 252, which will be described later, when it creates user-provided data. The value of the link cost is used when the navigation device 60 calculates a route.

When creating user-provided data, the navigation information generation unit 252 adds information to the road ID to indicate that this navigation information is based on user-provided data (for example, the ID is preceded by the flag "-"). Adding this information allows the navigation device 60 to display navigation information, which is based on user-provided data, separately from other navigation information.

FIG. 5C shows the configuration of the data body when the user-provided data is POI information. As shown in FIG. 5C, the data body in this case comprises the coordinates of the POI, the POI name, the telephone number, and the icon information. This icon information is, for example, the image data of an icon used for displaying the POI information on an output device 62 (monitor etc.) of the navigation device 60.

For example, the data body shown in FIG. 5C indicates that the POI coordinates are (k, l), the POI name is "gas station A", the telephone number is "mm-nnnn-oooo", and the image data of the icon used to display this POI on the screen of the navigation device 60 is "xxx.gif".

FIG. 5D shows the configuration of the data body when the user-provided data is guide information. When the user-provided data is guide information, the data body comprises the destination of the guide information, the guide start node ID of the guide information, and the guide data string. This guide data string, composed of data and a program used by the navigation device 60 at the coordinates of guide points, includes voice data, image data, and a program for guiding the vehicle to the destination.

For example, the data body shown in FIG. 5D indicates that the destination of the guide is "xxx", that the node ID of the start node of the guide to the destination is "eee", and that the navigation device 60 outputs "voice data A" when the vehicle 80 passes the "coordinate (f, g)", outputs "image data B" when the vehicle 80 passes the "coordinates (h, i)", and executes "guide program C" when the vehicle 80 finally passes the "coordinates (x, y)". The guide destination may also be the POI ID of POI information.

The user-provided data DB unit 270 stores such user-provided data for each user-provided data ID.

The official data DB unit 280 stores official data for each official data ID. The official data, composed of the official data ID and the data body, is input by the official information provider via the input device 20 or the CD-ROM drive 40. Like the user-provided data described above, this official data relates to the road information, POI information, and guide information. The configuration of the data body of the official data is similar to the configuration of the data body of the user-provided data described above and, therefore, its description is omitted.

For each navigation device ID, the navigation information storage unit 200 stores a user ID table (see Table 2) in which the user ID (user ID, registrant ID) of the user of the navigation device 60, user's password, the user address, and so on are included.

For example, the user ID table in Table 2 indicates that the user ID of the user of the navigation device 60 with the navigation device ID "xxx" is "yyy", the password is "zzz", and the user address is "aaa".

TABLE 2

Table 2 User ID table

| Navigation device ID | User ID | Password | Address | Download navigation information ID |
|---|---|---|---|---|
| xxx | yyy | zzz | aaa | bbb |
| ... | ... | ... | ... | ... |

This user ID table may further include the ID of navigation information (user-provided data) downloaded by each user (each navigation device 60). That is, when navigation information is transmitted (downloaded) to the navigation device 60, the navigation information download management unit 255, which will be described later, writes the ID of the transmitted navigation information into the column of the download navigation information ID in Table 2. When navigation information deletion (discontinuation) information is received from the navigation device 60, the navigation information download management unit 255 deletes the ID of the navigation information.

This allows the navigation information distribution server 10 to keep track of which navigation information each navigation device 60 has downloaded. In addition, when official data is added to the navigation information storage unit 200, the navigation information distribution server 10 (navigation information change notification unit 253 that will be described later) can notify the navigation device 60, which holds user-provided data similar to the contents of the added data, that official data similar to the user-provided data currently held by the navigation device 60 has been added.

The reliability score management unit 251 in FIG. 3 monitors the column of the user-provided data ID in the driving history (see Table 1) of each vehicle 80, stored in the driving history storage unit 260, and reflects the usage result (driving result based on the user-provided data) of each piece of user-provided data onto the value of the reliability score of the user-provided data.

That is, when a driving history indicating that the user-provided data ID "aaa" is used is added to the driving history storage unit 260, the reliability score management unit 251 searches the user-provided data DB unit 270 for the user-provided data with the user-provided data ID "aaa", and updates the reliability score of this user-provided data. That is, if a result is added indicating that the vehicle 80 could actually drive the road based on the user-provided data with the user-provided data ID "aaa", the reliability score management unit 251 updates the value of the reliability score of this user-provided data according to the received result.

In this case, it is possible that, when one driving history including the user-provided data ID "aaa" is added, the value of the reliability score of the user-provided data is incremented by one to directly reflect the usage count of the user-provided data. It is also possible that a predetermined expression is used to calculate a value based on the usage count and write the resulting value.

The value of the reliability score may be the number of vehicles 80 that drove using the user-provided data. In this case, when a driving history including the same navigation device ID and the same user-provided data ID is added, the reliability score management unit 251 summarizes the driving history and increments the value of the reliability score of the user-provided data by one. This method allows the navigation information distribution server 10 to indicate whether the reliability score of the user-provided data is based on the driving result of a relatively few vehicles or on the driving result of many vehicles.

In response to a message indicating the discontinuation (deletion) of user-provided data via the input/output unit 257 of the navigation device 60, the reliability score management unit 251 decreases the value of the reliability score of this user-provided data.

That is, the reliability score management unit 251 increases (increments) the value of the reliability score when more driving history data, which indicates that the vehicle 80 drove the road using the user-provided data, is received but decreases (decrements) the value of the reliability score when information, which indicates the deletion of user-provided data from the navigation device 60, is received.

Based on an instruction from the registration terminal 50, the navigation information generation unit 252 creates user-provided data and registers the created user-provided data into the user-provided data DB unit 270. The registration procedure will be described later in detail with reference to the flowchart.

The navigation information acquisition request processing unit 256 processes various types of information received from the navigation device 60. In response to a navigation information acquisition request from the navigation device 60 via the input/output unit 257, the navigation information acquisition request processing unit 256 passes this request to the navigation information search unit 254. Upon receiving the search result from the navigation information search unit 254, the navigation information acquisition request processing unit 256 creates a list of navigation information and sends the list to the navigation device 60 via the input/output unit 257.

When user-provided data is sent to the navigation device 60 via the input/output unit 257, the navigation information acquisition request processing unit 256 may delete the information on the registrant ID and the user ID included in the user-provided data. That is, from the viewpoint of security, it is possible not to include the information on the data registrant or the data user in the user-provided data that will be used by the navigation device 60.

In response to a navigation information download request from the navigation device 60 via the input/output unit 257, the navigation information acquisition request processing unit 256 passes this request to the navigation information download management unit 255. The navigation information acquisition request processing unit 256 sends the navigation information, read by the navigation information download management unit 255, to the navigation device 60 via the input/output unit 257.

The navigation information search unit 254 searches the navigation information storage unit 200 for the navigation information using the information included in a navigation information acquisition request as the key. For example, the information used as the key is the coordinates of the destination, the name of the destination, the type of requested information (road information, POI information, guide information), and the reliability score. The navigation information search unit 254 creates a list of navigation information that is searched for and passes this information to the navigation information acquisition request processing unit 256.

The navigation information download management unit 255 reads navigation information, requested via the navigation information acquisition request processing unit 256, from the navigation information storage unit 200 and passes the information, which has been read, to the navigation information acquisition request processing unit 256.

The navigation information distribution server 10 may further comprise the navigation information change notification unit 253 that notifies a change in the navigation information.

If user-provided data whose reliability score exceeds a predetermined value (stored in the auxiliary storage unit 240) is found in the user-provided data stored in the navigation information storage unit 200, the navigation information change notification unit 253 outputs the information on the user-provided data to the output device 30. This output may be displayed as an image on the monitor connected to the navigation information distribution server 10 or may be sent to the official data creator by mail.

The information provided in this way allows the official data creator to detect user-provided data, whose reliability score is increased, as soon as possible. That is, outputting such information allows the official data creator to create official data based on highly reliable user-provided data and therefore eliminates the need for creating the official data from the beginning.

When new official data is added and input to the official data DB unit 280, the navigation information change notification unit 253 may notify the navigation device 60 that uses user-provided data similar to the official data or the navigation device 60 of the registrant of this user-provided data that the new official data has been added.

That is, when new official data is added to the official data DB unit 280, the navigation information change notification unit 253 searches the user-provided data DB unit 270 for user-provided data similar to the contents of this official data. The navigation information change notification unit 253 reads the user ID of this user-provided data (see FIG. 5A). Next, the navigation information change notification unit 253 references the user ID table to identify the navigation device ID of the navigation device 60 corresponding to the user ID. After that, the navigation information change notification unit 253 sends a message to the navigation device 60 with this navigation device ID to indicate that official data having the contents similar to those of the currently stored user-provided data has been added.

The processing described above allows the user of user-provided data to know that the official data having the contents similar to those of the user-provided data, which has been used by the user, has been registered in the navigation information distribution server 10. That is, the user knows that the user can download the official data instead of the user-provided data that has been used.

The navigation device 60 that uses user-provided data whose contents are similar to those of official data or the navigation device 60 of the registrant of this user-provided data may be identified by referencing the information on the navigation information ID in the user ID table described above.

The reliability score management unit 251, the navigation information generation unit 252, the navigation information search unit 254, the navigation information download management unit 255, the navigation information acquisition request processing unit 256, and the navigation information change notification unit 253 described above are implemented when the CPU 120 shown in FIG. 2 described above reads and executes the navigation information distribution program 250. The input/output unit 257 in FIG. 3 is implemented when the communication unit 130, the input/output interface 140, the network interface 150, and the CPU 120 in FIG. 2 work together to execute the navigation information distribution program 250.

Next, referring to FIG. 1 to FIG. 5, the following describes the navigation devices 60 (60A, 60B) with reference to FIG. 6. FIG. 6 is a block diagram showing the configuration of the navigation device in FIG. 1.

The navigation device 60 comprises a main memory 610, a CPU 620, a communication unit 630, an input/output interface 640, a network interface 650, a GPS antenna 660, and an auxiliary storage unit 740.

An input device 61 used by the operator of this navigation device 60 for entering an instruction and an output device 62 for displaying the information from the auxiliary storage unit 740 may also be connected to the navigation device 60. The input device 61 is a controller, and the output device 62 is an image output device (display device) such as a display or a voice output device such as a speaker. The output device 62 may also be a touch panel for accepting an instruction on the screen.

A CD-ROM drive 63 may also be connected to the navigation device 60 to enter data from a CD-ROM 641 into the auxiliary storage unit 740.

A sensor 64, which senses the vehicle speed of the vehicle 80 and whether or not the brake was applied, can also be connected to the navigation device 60 to input the vehicle speed of the vehicle 80 or the brake application signal into the navigation device 60.

The CPU 620 executes various types of operation based on the program (navigation program 750) stored in the auxiliary storage unit 740. The main memory 610 is a storage area used by the CPU 620 for various types of operation.

The communication unit 630 communicates with the navigation information distribution server 10 via the network interface 650. The input/output interface 640 is a data input/output interface with the input device 61, the output device 62, and the CD-ROM drive 63. The network interface 650 is an interface used by the communication unit 630 for communication via the network 11. The GPS antenna 660 is an antenna for receiving the position information on the navigation device 60 (vehicle 80) from the GPS satellite 1. The received position information is output to the CPU 620 via the input/output interface 640.

The auxiliary storage unit 740, composed of hard disk devices, stores the navigation program 750 described above. The auxiliary storage unit 740 also has a navigation information storage unit 700 in a predetermined area to store navigation information, received from the navigation information distribution server 10 via the communication unit 630, and map information received from the CD-ROM drive 63. This navigation information storage unit 700 comprises a user-provided data storage unit 770 in which user-provided data is stored and an official data storage unit 780 in which official data is stored. For each of the navigation processing contents based on user-provided data, the navigation information storage unit 700 also stores warning message data indicating inconveniences that may occur during navigation processing.

Although user-provided data is stored in the user-provided data storage unit 770 and official data is stored in the official data storage unit 780 in the above description, it is also possible to attach a flag, which indicates the data type (user-provided data or official data), to each piece of navigation information and store both user-provided data and official data in the same storage area.

The CPU 620 reads navigation information from the user-provided data storage unit 770 or the official data storage unit 780 based on the navigation program 750 and, based on this information, performs navigation processing. The navigation program 750 will be described later in detail with reference to the drawings.

Figure 7:
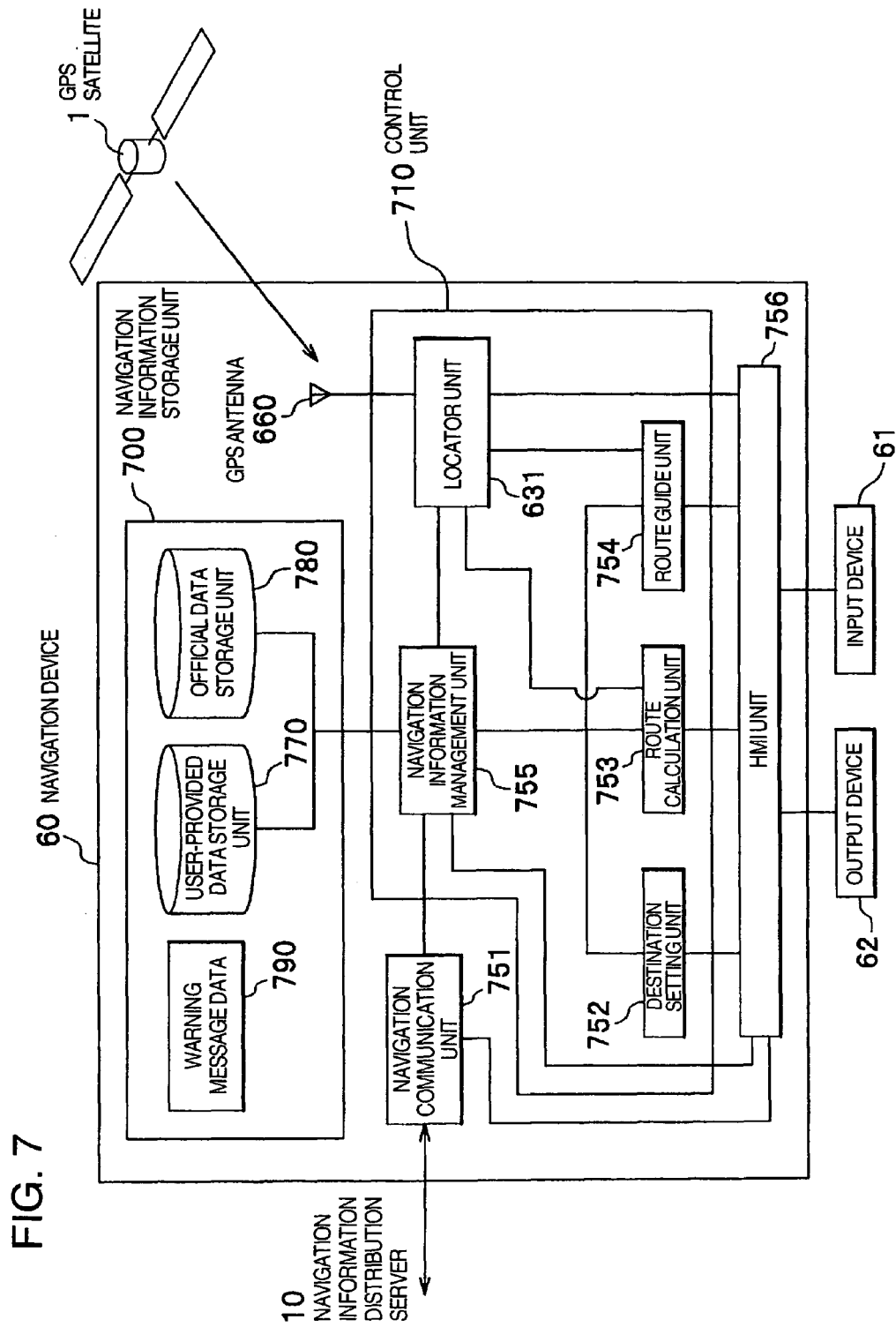
FIG. 7 is a block diagram showing the function of the navigation device shown in FIG. 1.

Next, referring to FIG. 1 to FIG. 6, the following describes the function of the navigation device 60 with reference to FIG. 7. FIG. 7 is a block diagram showing the function of the navigation device shown in FIG. 1. In FIG. 7, the configuration of the CD-ROM drive 63 and the sensor 64 in FIG. 6 is omitted.

The navigation device 60 comprises the navigation information storage unit 700 described above, an HMI (Human Machine Interface) unit 756, the GPS antenna 660, a navigation communication unit (navigation information communication unit) 751, and a control unit 710.

The HMI unit 756 is an interface between the control unit 710 and the input device 61/output device 62. That is, the HMI unit 756 converts the information, entered by the user via the input device 61 (microphone and touch panel), to a predetermined command for output to the control unit 710 and converts the signal, output from the control unit 710, to a voice or an image for output to the output device 62.

For example, when the user enters an instruction to display a map, corresponding to the current driving position of the vehicle 80, via the touch panel, the HMI unit 756 acquires the position information (latitude and longitude) on the vehicle (vehicle 80) from a locator unit 631. Next, the HMI unit 756 acquires the navigation information (user-provided data, official data, and map information) on the surrounding area of this vehicle 80 from the navigation information storage unit 700 via a navigation information management unit 755. The HMI unit 756 creates image data, created by plotting the current position of the vehicle 80 on the navigation information (map information), and outputs this data to the touch panel.

Figure 8:
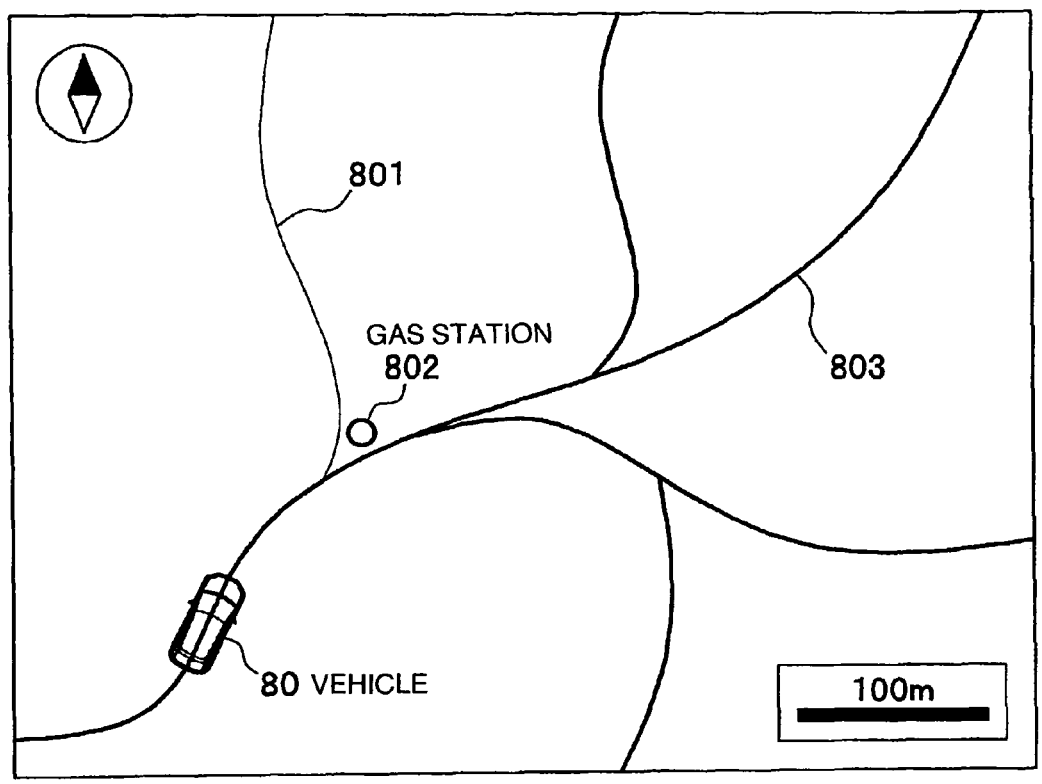
FIG. 8 is a diagram showing an example of a screen output on an output device by the HMI unit shown in FIG. 7.

FIG. 8 is a diagram showing an example of a screen that is output by the HMI unit, shown in FIG. 7, onto the output device. As shown in FIG. 8, when the screen is displayed on the output device 62, the HMI unit 756 changes the color and the thickness of a line corresponding to the information based on user-provided data. For example, the HMI unit 756 displays road information (numeral 801) and POI information (numeral 802), which are based on user-provided data, differently from those of the navigation information (numeral 803) other than user-provided data, using a different colors and line thickness. This display method allows the user to easily identify that the information displayed on the output device 62 is based on user-provided data or on navigation information other than user-provided data.

The HMI unit 756 checks the road ID, included in the navigation information, to determine whether the information on the displayed road or POI is based on user-provided data. For example, the HMI unit 756 determines that the navigation information is user-provided data if the road ID of the navigation information includes the sign "-" and that the navigation information is data other than user-provided data (official data) if the sign "-" is not included in the road ID of the navigation information. It is also possible to reference the data type information (see FIG. 5A), included in the navigation information, to determine whether the information is based on user-provided data.

The setting information on the display format (the color and the line of user-provided data are changed or user-provided data with a reliability score lower than a predetermined value is not displayed) of the user-provided data is stored in the navigation information storage unit 700, and the HMI unit 756 displays the information on the output device 62 based on this setting information. Note that this setting information can be entered or changed by the user via the input device 61.

When a request to download user-provided data is accepted via the input/output unit or when navigation processing is performed via the control unit 710 based on user-provided data, the HMI unit 756 outputs a warning message from the output device 62. The warning message issued in this case is a voice message or an image message indicating that, for example, the position of a road or a POI is sometimes different from the actual position. This warning message, if output, allows the user of the navigation device 60 to download user-provided data while being aware that there is a risk in using the user-provided data. An example of this warning message will be described later in detail with reference to the drawings.

The HMI unit 756 is implemented by the navigation program 750, executed by the CPU 620, and the input/output interface 640.

Returning to FIG. 7, upon receiving the position information and the time information on the GPS satellite 1 from the GPS satellite 1 described above, the GPS antenna 660 shown in FIG. 7 outputs this information to the locator unit 631. The locator unit 631 calculates the position (latitude and longitude) of the vehicle (vehicle 80).

The navigation communication unit 751 communicates with the navigation information distribution server 10 via the network 11 (see FIG. 1). More specifically, the navigation communication unit 751 sends a navigation information acquisition request (download request), output from the navigation information management unit 755, to the navigation information distribution server 10 and receives navigation information (user-provided data or official data) from the navigation information distribution server 10. After that, the navigation communication unit 751 outputs the received navigation information to the navigation information management unit 755.

The navigation communication unit 751 sends the driving history of the vehicle 80, on which this navigation device 60 is mounted, to the navigation information distribution server 10. This navigation communication unit 751 comprises the communication unit 630 and the network interface 650 shown in FIG. 6.

The control unit 710, which comprises a destination setting unit 752, a route calculation unit 753, a route guide unit 754, the navigation information management unit 755, and the locator unit 631, controls the whole navigation device 60. The control unit 710 is implemented by executing the navigation program 750 by the CPU 620 in FIG. 6.

In response to destination information entered via the HMI unit 756 and the input device 61, the destination setting unit 752 sets the destination of the navigation device 60. For example, when the position of a destination is entered from the touch panel or the input device 61, the destination setting unit 752 stores the position coordinates of this destination in the main memory 610 shown in FIG. 6. When the name of a destination is received from the touch panel or the input device 61, the destination setting unit 752 searches the navigation information storage unit 700 for the POI information or guide information on this destination via the navigation information management unit 755 and stores the information in the main memory 610.

The route calculation unit 753 acquires the position coordinates of the destination from the main memory 610 and the position coordinates of the vehicle (vehicle 80) from the locator unit 631. After that, the route calculation unit 753 calculates a route from the position of the vehicle to the destination. To calculate the route, the route calculation unit 753 references the road coordinate string and the link cost (see FIG. 5B) of each road included in the user-provided data (official data) to calculate the shortest route from the position of the vehicle to the destination.

When the user-provided data (road information) includes attribute information indicating that the road is a community road or when the reliability score is lower than a predetermined value, it is possible for the route calculation unit 753 not to include the road in the route calculation. In this way, the navigation device 60 can set the route that does not include a community road or a low reliability score road. The setting information on the route calculation may also be stored in the navigation information storage unit 700 or may be entered or changed by the user via the input device 61.

When the route calculation unit 753 reads the guide information from the main memory 610, that is, when the destination setting unit 752 searches for the guide information on the destination, a screen may be displayed on the output device 62 to prompt the user to select whether to include the guide information in the route calculation.

When the route calculation unit 753 acquires multiple pieces of guide information, that is, when the navigation information storage unit 700 stores multiple pieces of guide information that guides the vehicle to the predetermined destination, it is also possible for the route calculation unit 753 to display the guide start position of each piece of guide information on the screen of the output device 62 to prompt the user to enter a selection of the guide information. When the user enters a selection of the guide information, the route calculation unit 753 calculates the route with the guide start position (position coordinates of the guide start position identified by the guide start node ID in FIG. 5D) of the selected guide information as the destination. The route calculation unit 753 stores the calculated route in the main memory 610.

The route guide unit 754 outputs navigation information on the output device 62 via the HMI unit 756 to guide the user. That is, the route guide unit 754 references the route, POI information, and guide information read from the main memory 610 and the position of the vehicle calculated by the locator unit 631 to execute navigation processing. For example, when the vehicle 80 is approaching an intersection, the route guide unit 754 outputs a voice or an image on the output device 62 to indicate a direction into which the vehicle to turn.

The locator unit 631 receives the position information and the time information on the GPS satellite 1 from the GPS satellite 1 via the GPS antenna 660 described above and calculates the position coordinates (latitude and longitude) of the vehicle (vehicle 80). The locator unit 631 also references the position coordinates of the vehicle 80 that is calculated and the map information that is stored in the auxiliary storage unit 740 to modify the position of the vehicle 80 in the navigation information. For example, if the position coordinates of the vehicle 80 received from the GPS antenna 660 are not those of a road in the map information, the locator unit 631 shifts the position coordinates to the position of the road. Modifying the position coordinates in this way enables the navigation device 60 to navigate based on the correct vehicle position.

When navigation information is received from the navigation information distribution server 10 via the navigation communication unit 751, the navigation information management unit 755 stores the received navigation information in the navigation information storage unit 700. The navigation information management unit 755 also sends the driving history of the vehicle 80 to the navigation information distribution server 10 via the navigation communication unit 751. The navigation communication unit 751 sends this information, for example, when the vehicle 80 (navigation device 60) passes a node.

That is, the navigation information management unit 755 references the map information stored in the navigation information storage unit 700 and the current position information of the vehicle 80 output from the locator unit 631. Upon detecting that the vehicle 80 has passed a node, the navigation information management unit 755 sequentially stores, from this time on, the driving coordinates of the vehicle 80, output from the locator unit 631, into the main memory 610. The driving coordinates may be stored at an interval of a predetermined time or a predetermined distance. At the same time, the navigation information management unit 755 also stores the storage start date/time, the number of brake application times of the vehicle 80 that is output from the sensor 64, and the user-provided data ID of the user-provided data used by the navigation device 60. When the vehicle 80 passes the next node, the navigation information management unit 755 creates a driving history created by adding the end date/time and the navigation device ID of the navigation device 60 to the information stored in the main memory 610, and sends the created driving history to the navigation information distribution server 10 via the navigation communication unit 751. Note that the driving history created at this time is encrypted to prevent information alteration or impersonation on the network 11 (see FIG. 1).

When a list of navigation information is received from the navigation communication unit 751, the navigation information management unit 755 outputs this list to the output device 62 via the HMI unit 756. For example, as shown in the balloon 13 in FIG. 1, the navigation information management unit 755 displays the screen where the user-provided data and the official data are distinguished and displayed. Also, when a navigation information selection is received via the input device 61 and the HMI unit 756, the navigation information management unit 755 causes the navigation communication unit 751 to download the selected navigation information.

When a user-provided data deletion instruction is entered from the input device 61, the navigation information management unit 755 deletes the user-provided data from the user-provided data storage unit 770. In addition, the navigation information management unit 755 sends the user data ID of the user-provided data to be deleted to the navigation information distribution server 10 via the navigation communication unit 751. That is, the navigation information management unit 755 notifies the user-provided data, which will not be used any more by the navigation device 60, to the navigation information distribution server 10.

When the components of the control unit 710 execute calculation based on user-provided data (road information, POI information, and guide information), the navigation information management unit 755 causes the HMI unit 756 to output a warning message to the output device 62 to notify the user that the user-provided data may be incorrect. In this case, the HMI unit 756 also displays the screen on the output device 62 to prompt the user to select whether to execute calculation based on the user-provided data. If, after this warning message is output, the user of the navigation device 60 enters an instruction, via the input device 61 and the HMI unit 756, to indicate that the use of user-provided data is discontinued, the control unit 710 does not execute calculation based on user-provided data.

This warning message is stored in the auxiliary storage unit 740 of the navigation device 60 as warning message data 790. When the components of the control unit 710 execute calculation based on user-provided data, the HMI unit 756 reads the warning message data 790 from the auxiliary storage unit 740 and outputs the message data to the output device 62.

The following describes warning messages (contents of the warning message data 790), output by the HMI unit 756 to the output device 62, more in detail with reference to FIG. 9. FIG. 9 is a diagram showing the contents of warning message data in FIG. 7.

Because map information created based on user-provided data sometimes includes a road or a POI that does not actually exist or the position of a road or a POI sometimes differs from the actual position, the HMI unit 756 outputs a warning message to alert the user to this fact. For example, the HMI unit 756 reads a message "User-provided data sometimes shows a non-existing road or POI or shows a position different from the actual position" from the warning message data 790 and outputs the message on the output device 62. A warning message in this case may include information on the traffic rule, for example, a description saying that one-way traffic information is sometimes incorrect. A road or a POI, which is based on user-provided data, may be displayed on the output device 62 with a color or a symbol added thereto to distinguish it from other data.

When the destination setting unit 752 sets a destination based on user-provided data, there is sometimes a risk that the destination does not actually exist or the position of the destination POI is different from the actual position. The HMI unit 756 outputs a warning message to alert the user to this fact. For example, the HMI unit 756 reads a message "If a POI based on user-provided data is set as a destination, there is sometimes a risk that the POI does not actually exist or a destination different from the actual destination is set" from the warning message data 790 and outputs the message on the output device 62.

When the route calculation unit 753 calculates a route based on user-provided data, there is sometimes a risk that a non-existing road is included in the route or the position of a road in the route is different from the actual position. The HMI unit 756 outputs a warning message to alert the user to this fact. For example, the HMI unit 756 reads a message "If user-provided data is used for route calculation, there is sometimes a risk that a non-existing road is used in the route or the position of a road used in the route is different from the actual position" from the warning message data 790 and outputs the message on the output device 62. The warning message issued in this case may include a description saying that the passage time of a route is sometimes incorrect.

When the route guide unit 754 outputs guide information on the driving on a road based on user-provided data, there is sometimes a risk that there is no POI used as a guiding landmark, an incorrect guide message is output, or the position of a guide destination is different from the actual position. The HMI unit 756 outputs a warning message to alert the user to this fact. For example, the HMI unit 756 reads a message "If user-provided data is used for route calculation, there is sometimes a risk that there is no guiding landmark, a guide message is issued at an incorrect time, a guiding direction is incorrect, or the position of a guide destination is different from the actual position" from the warning message data 790 and outputs the message on the output device 62.

After outputting those messages, the HMI unit 756 displays a selection input acceptance screen on the output device 62 to prompt the user to respond whether to use user-provided data. Based on the input result, the HMI unit 756 causes the control unit 710 to perform calculation using the user-provided data or to perform calculation using navigation information (official data) other than user-provided data.

This method allows the user to determine whether to cause the navigation device 60 to execute navigation based on user-provided data while being aware that there is a risk of inconvenience that might be generated by using user-provided data.

The warning message output by the HMI unit 756 may be simply a notice saying "Navigation processing based on user-provided data will start".

The warning message data 790 may also be stored in the navigation information storage unit 200 of the navigation information distribution server 10. In this case, when navigation information is sent (downloaded) to the navigation device 60, the navigation information distribution server 10 sends warning messages with the navigation information and outputs them on the output device 62 of the navigation device 60.

When the completion of a guide (navigation) to the destination is completed, it is also possible for the route guide unit 754 to ask the user whether to continue or discontinue the use of the user-provided data used in the guide. That is, a screen may be displayed on the output device 62 to prompt the user to select whether to continue or discontinue the use of user-provided data. In this case, when a selection input is received via the input device 61 indicating that the use of the user-provided data will be discontinued, the route guide unit 754 deletes the user-provided data, used for the guide, from the navigation information storage unit 700. After that, the navigation information management unit 755 sends the ID of the deleted user-provided data (user-provided data ID) to the navigation information distribution server 10 via the navigation communication unit 751.

That is, each time the navigation device 60 uses user-provided data as a guide to the destination, the user is requested to send a judgment, which indicates whether to retain or delete the user-provided data, to the navigation information distribution server 10. This enables the navigation information distribution server 10 to calculate the reliability score more correctly.

Next, referring to FIG. 1 to FIG. 8, the following describes the procedure used by the navigation information distribution server 10 for creating user-provided data (road information) based on a driving history with reference to FIG. 10. FIG. 10 is a flowchart showing the procedure used by the navigation information distribution server in FIG. 1 for creating user-provided data.

In the description below, assume that the vehicle 80 has already finished driving and that the driving history of this vehicle 80 is accumulated in the navigation information distribution server 10.

First, the registrant uses the input device (keyboard) of the registration terminal 50 to enter the registrant ID (step S200). In response, the registration terminal 50 sends the received registrant ID to the navigation information distribution server 10 via the network 11 (see FIG. 1) (step S201). In this case, it is also possible that the navigation information generation unit 252 of the navigation information distribution server 10 requests the registration terminal 50 to prompt for the entry of the registrant ID and the password and, only when the registrant is identified as authentic by referencing the user ID table described above, continues the subsequent input operation.

When the registrant ID is received via the input/output unit 257, the navigation information generation unit 252 of the navigation information distribution server 10 searches the driving history storage unit 260 for the driving history of this registrant (navigation device 60) using the ID as the key. The navigation information generation unit 252 sends the driving history (driving trace) to the registration terminal 50 via the network 11 (step S211). The driving history that is sent in this case is a map in the range, where the vehicle 80 drove, in which the route along which the vehicle 80 drove is shown.

When the driving history of the vehicle (vehicle 80) is received from the navigation information distribution server 10, the registration terminal 50 displays the driving history on the display device (monitor etc., not shown) of the registration terminal 50 (step S221). The registrant (user) confirms the driving history of the vehicle (vehicle 80) on the display screen. After that, the registrant enters a part of the driving history which is displayed on the screen and which is to be registered in the navigation information distribution server 10 (step S222). This instruction is entered from an input device (mouse, keyboard) connected to the registration terminal 50. The registration terminal 50 sends this registration instruction to the navigation information distribution server 10 (step S223).

Figure 11:
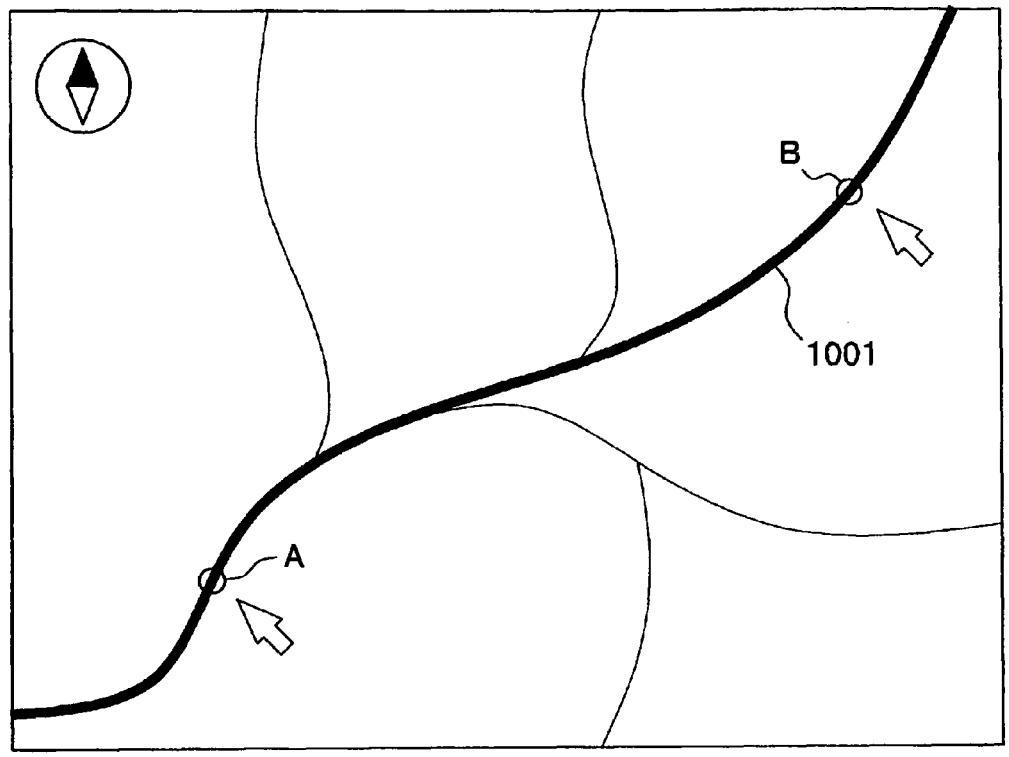
FIG. 11 is a diagram showing an example of a screen displayed on the display device of the registration terminal shown in FIG. 1.

FIG. 11 is a diagram showing an example of the screen displayed on the display device of the registration terminal shown in FIG. 1. On the display device of the registration terminal 50, the driving history (numeral 1001) of the vehicle 80 is displayed in the map in the range where the vehicle 80 drove, as shown in FIG. 11. To register the interval from A to B of the driving history, indicated by the numeral 1001, into the navigation information distribution server 10, the user uses a mouse to select and enter the interval from A to B.

Returning to the description of FIG. 10, the navigation information generation unit 252 of the navigation information distribution server 10, which receives a driving history registration instruction from the registration terminal 50, determines if navigation information similar to this driving history (route) is already registered in the navigation information storage unit 700 (step S231).

Figure 12:
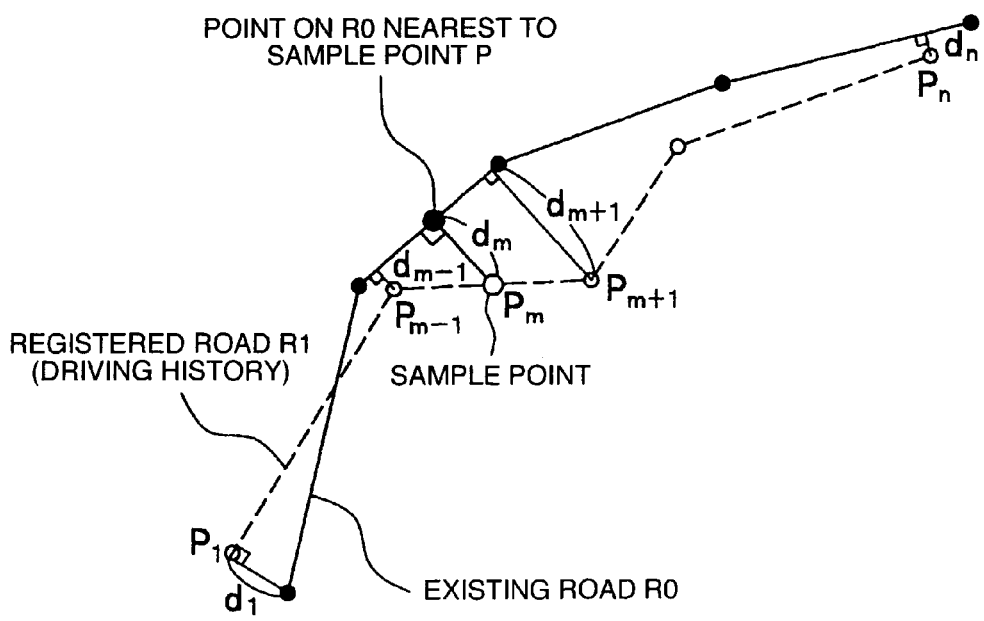
FIG. 12 is a diagram showing the determination processing in this embodiment for determining if navigation information is similar to a driving history (route).

The following describes this determination processing with reference to FIG. 12. FIG. 12 is a diagram showing the determination processing in this embodiment for determining if navigation information is similar to a driving history (route).

First, the navigation information generation unit 252 reads the coordinate string (a string of the coordinates of the road along which the vehicle 80 drove) of the driving history specified by the registration instruction and searches the navigation information storage unit 700 for navigation information (existing road) included in the area of the coordinate string.

Next, the navigation information generation unit 252 joins the elements of the coordinate string of the driving history with a line to form a road R1. After that, the navigation information generation unit 252 sets sample points P (P1-Pn) on the road R1 at a specified interval (for example, at an interval of 10 m).

After that, the navigation information generation unit 252 calculates the distance d (d1-dn) from each sample point P to an existing road R0. If the distance dn from the sample point Pn to the existing road R0 is equal to or shorter than a predetermined distance (for example, 1 m), the sample point P is determined near to the existing road R0.

If the ratio of the number of sample points P determined near to the existing road R0 to the total number of sample points P of the road R1 is equal to or higher than a predetermined ratio (for example, 50% or higher), it is determined that the road R1 is near to the existing road R0. That is, it is determined that the navigation information including the existing road R0 is similar to the data of the driving history. On the other hand, if the number of sample points P determined near to the road R0 is lower than the predetermined ratio (for example, lower than 50%), it is determined that the navigation information is not similar to the driving history.

In this way, the navigation information generation unit 252 determines if navigation information, which is similar to the user-provided data to be registered in the navigation information storage unit 700, is already registered. If navigation information similar to the driving history, which is specified to be registered, is already registered (Yes in step S231 in FIG. 10), the navigation information generation unit 252 notifies the registration terminal 50 via the network 11 that the navigation information similar to the route specified to be registered is already registered (step S241). In this case, the navigation information generation unit 252 does not register the driving history as user-provided data.

On the other hand, if navigation information similar to the driving history is not yet registered in the navigation information storage unit 700 (No in step S231), the navigation information generation unit 252 registers the driving history of the registrant into the user-provided data DB unit 270 (step S232). That is, the navigation information generation unit 252 creates user-provided data based on the driving history, which is specified to be registered, and stores this data into the user-provided data DB unit 270.

More specifically, the navigation information generation unit 252 references the map information, stored in the navigation information storage unit 200, to identify the start node ID and the end node ID of the road in the driving history. The navigation information generation unit 252 stores the identified IDs in the data body. It also stores the driving coordinate string, included in the driving history, as the road coordinate string in the data body. In addition, the navigation information generation unit 252 calculates the value of the link cost of the road from the start date/time and the end data/time included in the driving history and stores the calculated value in the data body (see Table 1 and FIG. 5B). The navigation information generation unit 252 also stores the registrant ID sent in step S201 and the user-provided data ID issued by the navigation information generation unit 252 in the user-provided data (see FIG. 5A). No data is initially stored in the reliability score and the user ID.

Next, the navigation information generation unit 252 sends the registration completion notification of the driving history, specified in the registration instruction, to the registration terminal 50 (step S233).

In response to the notification sent in step S241 (notification indicating that navigation information similar to the route to be registered is already registered) or the notification sent in step S233 (notification indicating that the driving history has been registered), the registration terminal 50 displays the notification on the display device (step S251) and once terminates the processing.

In this way, the user can register the driving history of user's vehicle 80 in the navigation information distribution server 10. The navigation information distribution server 10 can also register POI information or guide information based on an instruction entered from the registration terminal 50.

For example, after receiving the registrant ID from the registration terminal 50, the navigation information distribution server 10 accepts a registration instruction of POI information and guide information. As in step S231 in FIG. 10, the navigation information generation unit 252 determines if there is official data similar to the POI information or guide information to be registered. If there is no official data similar to the POI information or guide information to be registered, the navigation information generation unit 252 registers the information into the user-provided data DB unit 270 as user-provided data (processing similar to that in step S232). After that, the navigation information generation unit 252 notifies the registration terminal 50 that the information has been registered (processing similar to that in step S233).

On the other hand, if there is navigation information similar to the POI information or guide information to be registered, the navigation information generation unit 252 sends a notification to the registration terminal 50 to indicate that navigation information similar to the information to be registered is already registered (processing similar to that in step S241).

When a registrant wants to register POI information from the registration terminal 50, the registrant causes the navigation information generation unit 252 to display map information including the POI to be registered on the monitor of the registration terminal 50. The registrant uses the mouse to specify the position of the POI on the map and uses the keyboard to enter information such as the name of the POI and telephone number. The position coordinates, the name, and the telephone number of the POI are sent from the registration terminal 50 to the navigation information distribution server 10.

The navigation information generation unit 252 checks the position coordinate, the POI name, or the telephone number included in the POI information sent from the registration terminal 50 to determine if navigation information similar to the POI information to be registered is already registered.

In this way, the navigation information distribution server 10 can prevent user-provided data of similar contents from being registered multiple times from the navigation device 60.

Next, referring to FIG. 1 to FIG. 12, the following describes the procedure used by the navigation device 60 to download navigation information for updating from the navigation information distribution server 10 with reference to FIG. 13, FIGS. 14A and 14B, and FIGS. 15A and 15B. FIG. 13 is a flowchart showing the procedure used by the navigation device in FIG. 1 for downloading navigation information for updating from the navigation information distribution server. FIG. 14A to FIG. 15B are diagrams showing examples of screens displayed on the output device of the navigation device in FIG. 6.

Figure 14A:
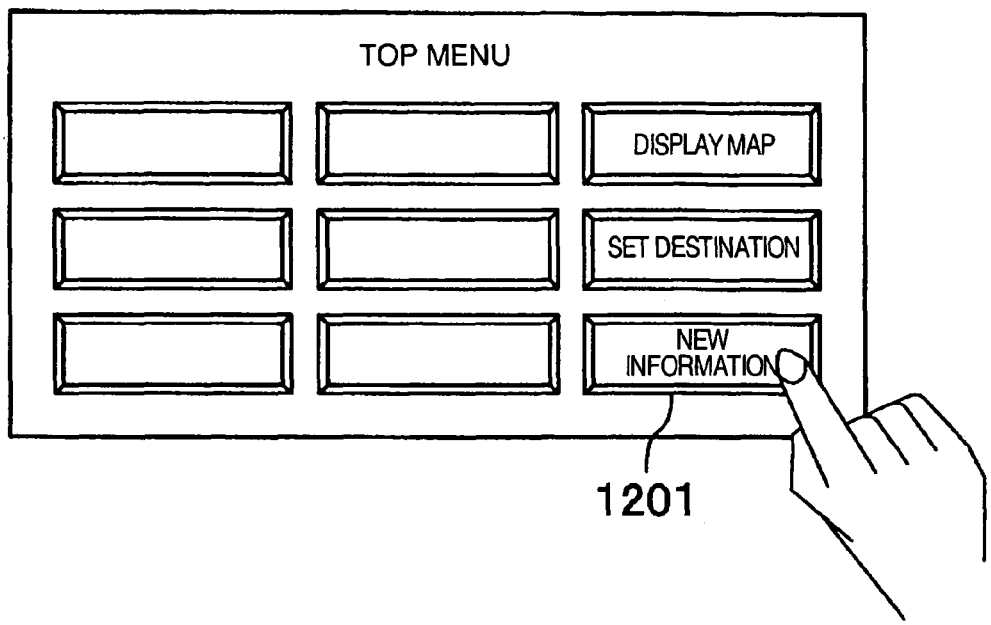
FIG. 14A is a diagram showing an example of a screen displayed on the output device of the navigation device shown in FIG. 6.
Figure 14B:
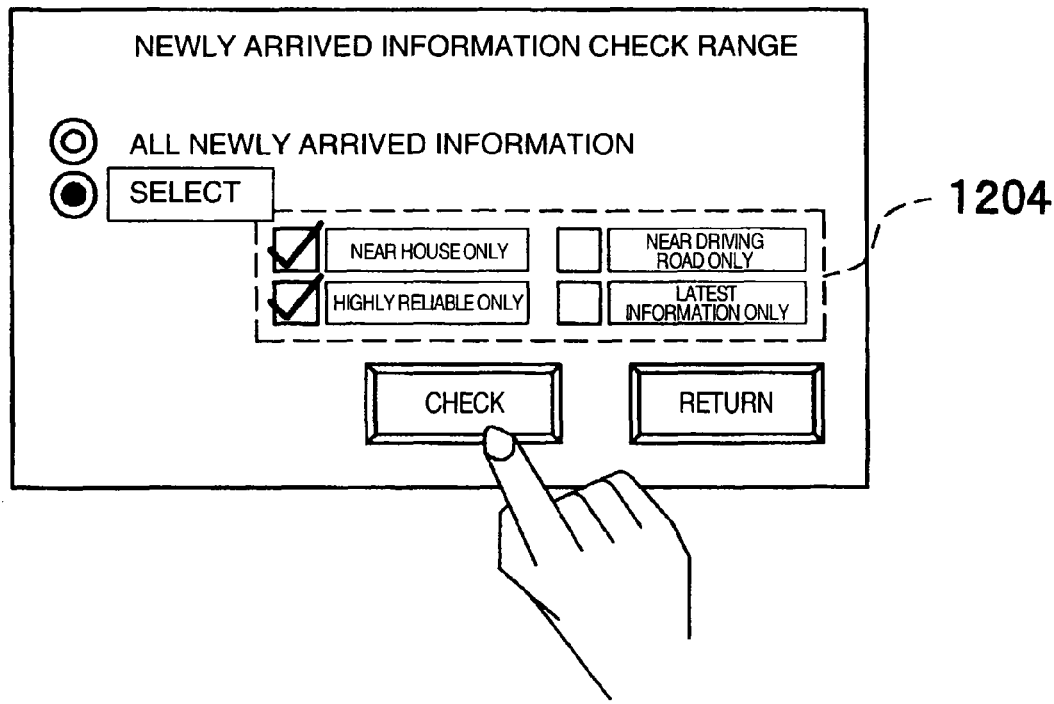
FIG. 14B is a diagram showing an example of a screen displayed on the output device of the navigation device shown in FIG. 6.

First, the HMI unit 756 of the navigation device 60 displays the top menu on the output device 62 to prompt the user to enter an instruction to the navigation device 60 (step S101). As shown in FIG. 14A, this top menu includes the "Display map" button for displaying map information, the "Set destination" button for displaying the destination setting screen, and "New information" button (area 1201) for checking for newly arrived navigation information.

When the user of the navigation device 60 presses the "New information" button via the input device 61, the HMI unit 756 accepts an input of the checking range of newly arrived information (step S102). For example, when the user presses the "New information" button on the touch panel in FIG. 14A, the HMI unit 756 displays the input screen via which the checking range of newly arrived navigation information is entered (see FIG. 14B). In this example, the user specifies that not all newly arrived navigation information but only newly arrived, highly reliable navigation information near the house be checked.

Next, upon detecting that an acquisition request to acquire newly arrived navigation information is entered from the input device 61, the HMI unit 756 sends the acquisition request to acquire newly arrived navigation information to the navigation information distribution server 10 (step S103). For example, upon detecting that the check buttons are selected as shown in the area 1204 in FIG. 14B, HMI unit 756 sends an acquisition request to acquire highly reliable, newly arrived navigation information on the area near the house to the navigation information distribution server 10.

In response to the acquisition request to acquire newly arrived navigation information from the registration terminal 50, the navigation information acquisition request processing unit 256 of the navigation information distribution server 10 searches the navigation information storage unit 200 for newly arrived navigation information (navigation information for updating) to be sent to the navigation device 60 (step S111).

More specifically, when the navigation information acquisition request processing unit 256 receives the acquisition request to acquire newly arrived navigation information, it passes this request to the navigation information search unit 254 that searches the navigation information storage unit 200 for navigation information newer than (added to) the navigation information already downloaded to the navigation device 60. In this case, if the acquisition request to acquire navigation information sent from the navigation device 60 includes the condition "near to user's house" and "highly reliable" described above, the navigation information search unit 254 references the position information on the home address of this user (stored in the user ID table) and searches for newly arrived information which is user-provided data on the area near to user's house and whose reliability score is higher than a predetermined threshold (stored in the navigation information storage unit 200).

The navigation information search unit 254 searches for navigation information newer than the navigation information already downloaded to the navigation device 60 as follows. First, the navigation information search unit 254 references the user ID table (see Table 2) to identify the navigation information currently downloaded to the navigation device 60 and then searches the navigation information storage unit 200 for navigation information whose registration date is later than the registration date of the currently-downloaded navigation information. Alternatively, it is possible for the navigation information search unit 254 to receive a list of navigation information, currently stored in the navigation device 60, from the navigation device 60 and, based on this list, searches for navigation information newer than the currently stored navigation information.

When the search result of the navigation information search unit 254 is received, the navigation information acquisition request processing unit 256 creates a newly arrived navigation information list (newly arrived list) based on this search result and sends this list to the navigation device 60 (step S112).

When the newly arrived navigation information list is received from the navigation information distribution server 10, the navigation device 60 displays this list on the output device 62 (step S121). In this case, it is also possible that the user-provided data tab and the official data tab are displayed in the newly arrived navigation information list, as shown in the example in FIG. 15A, to allow the user to select one of the tabs on the touch panel to cause the HMI unit 756 to switch the display between the user-provided data and the official data.

When a selection input of navigation information is accepted from the input device 61 or the touch panel (step S122), the HMI unit 756 sends the acquisition request to acquire the selected navigation information to the navigation information distribution server 10 (step S123).

Figure 15A:
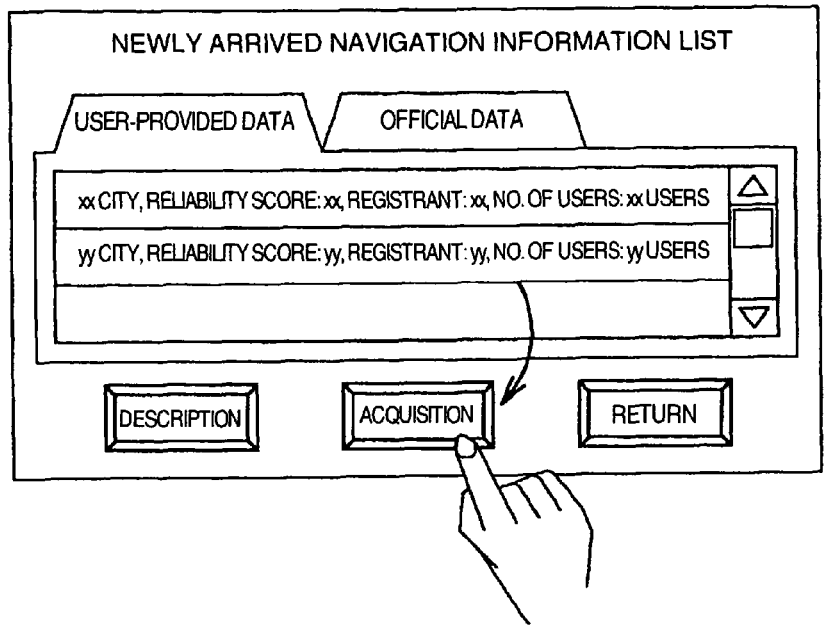
FIG. 15A is a diagram showing an example of a screen displayed on the output device of the navigation device shown in FIG. 6.

For example, when the user selects the user-provided data on the newly arrived list screen shown in FIG. 15A and selects the "Acquisition button", the HMI unit 756 sends this user-provided data acquisition request (download request) to the navigation information distribution server 10. When the user selects the "Description button" on the screen shown in FIG. 15A, the HMI unit 756 displays the navigation information description screen shown in FIG. 15B. That is, before navigation information is downloaded, the description screen (preview screen) for this navigation information is displayed.

More specifically, the HMI unit 756 sends the acquisition request to acquire the description information (screen information for preview) on the navigation information, selected on the screen, to the navigation information distribution server 10 via the navigation communication unit 751. The acquisition request to acquire the description information on the navigation information and the request to download the navigation information include the data ID (user-provided data ID or official data ID) of this user-provided data and the navigation device ID of this navigation device 60.

In response to this acquisition request, the navigation information search unit 254 of the navigation information distribution server 10 searches the navigation information storage unit 200 for the navigation information with the data ID, included in the acquisition request, as the key and sends this navigation information to the navigation device 60.

Figure 15B:
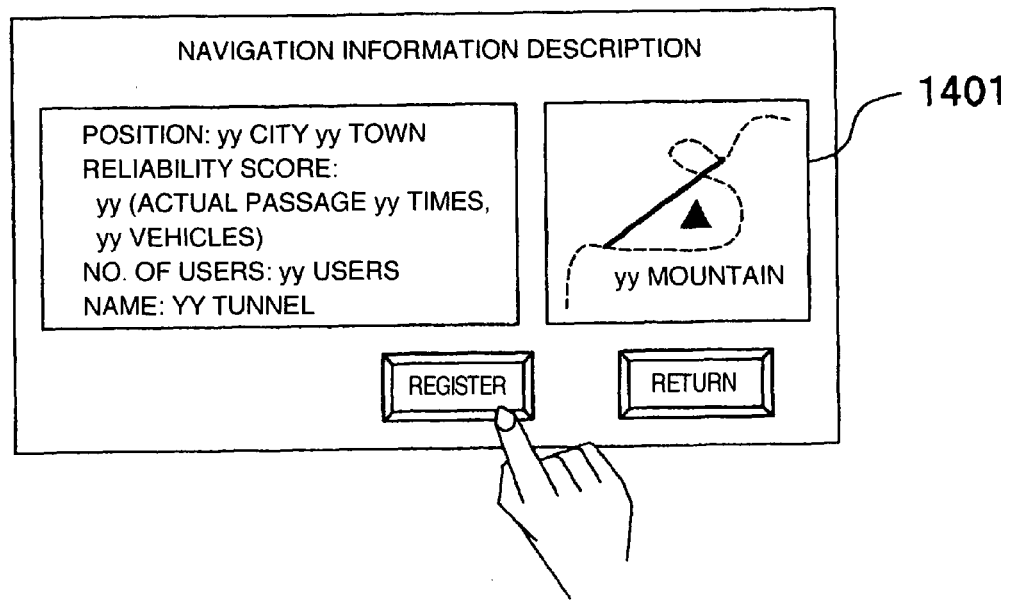
FIG. 15B is a diagram showing an example of a screen displayed on the output device of the navigation device shown in FIG. 6.

The navigation device 60, which receives this navigation information, displays the navigation information description screen on the output device 62. For example, as shown in FIG. 15B, the navigation information description screen includes the position (location) indicated by the navigation information, the reliability score of the navigation information, the registrant, and number of users, and the name of the place indicated by this data, as well as the outline drawing (area 1401) of this navigation information. The outline drawing of this navigation information is created by combining the position coordinates included in this navigation information and the map information in the navigation information storage unit 700.

The navigation information description screen shown in FIG. 15B indicates that the data is about "YY tunnel" and that the position is "yy city, yy town". The screen also indicates the reliability score of this data is "yy", the actual number of times the vehicles passed through this tunnel is "yy times", the number of vehicles that drove through this tunnel is "yy vehicles", the registrant of this data is "yy", the reliability score of this registrant is "yy", and this user-provided data is currently used by "yy persons".

When the "Acquisition button" is selected in FIG. 15B via the input device 61, the HMI unit 756 sends the request to download this user-provided data to the navigation information distribution server 10. On the other hand, when the "Return button" is selected, the HMI unit 756 returns the display screen to the newly arrived navigation information list screen shown in FIG. 15A.

When user-provided data is selected from the newly arrived navigation information list, when the description information on this user-provided data is displayed, or when user-provided data is selected and the request to download the user-provided data is entered (see "Acquisition button" in FIG. 15B), it is also possible for the HMI unit 756 described above to read the warning message data 790 from the navigation information storage unit 700 and output a warning message on the output device 62.

The navigation device 60 displays the screen described above to allow the user to check if the navigation information is user-provided data or to check for an inconvenience, which might be generated from the use of the user-provided data, before downloading the navigation information from the navigation information distribution server 10.

In response to a navigation information acquisition request (download request) from the navigation device 60, the navigation information distribution server 10 searches the navigation information storage unit 200 for the requested navigation information and sends search result to the navigation device 60 (step S131). That is, when the navigation information acquisition request processing unit 256 of the navigation information distribution server 10 receives the navigation information download request, the navigation information download management unit 255 searches the navigation information storage unit 200 for the requested navigation information and then the navigation information acquisition request processing unit 256 sends the resulting navigation information to the navigation device 60 (causes the navigation device 60 to download). In this case, the navigation information download management unit 255 writes the user ID of the navigation device 60 into the user ID column of the navigation information that is sent. Alternatively, the navigation information download management unit 255 writes navigation information ID of the navigation information, which is sent, in the download navigation information ID column of the navigation device 60 in the user ID table (see Table 2).

When the navigation information is received from the navigation information distribution server 10, the navigation device 60 stores the received navigation information in the navigation information storage unit 700. After that, the navigation device 60 displays the navigation information acquisition completion message on the output device 62 (step S141). That is, when the navigation information is received via the navigation communication unit 751, the navigation information management unit 755 stores the received navigation information in the navigation information storage unit 700. The HMI unit 756 displays the screen on the monitor to notify that the downloading of the navigation information is completed.

After that, the navigation device 60 references the downloaded official data or user-provided data to perform navigation processing. This means that the navigation device 60 can perform navigation processing based on the updated, latest navigation information.

In addition, when navigation processing is performed based on user-provided data, the navigation device 60 outputs a message on the output device 62 as described above to notify that user-provided data is used for the navigation or a warning message indicating an inconvenience that might be generated by using user-provided data. This allows navigator manufacturers to clearly indicate the scope of responsibility on the navigator manufacturers and the scope of responsibility on the user side.

The present invention is applicable without being limited to the embodiment described above.

For example, although the navigation device 60 in this embodiment outputs a warning message when using user-provided data for displaying a map, setting a destination, calculating a route, or guiding a vehicle to a route, it is also possible for the user to set a condition under which the warning message is to be issued.

It is also possible to set up the system in which a warning message will not be output if the reliability score of the user-provided data is equal to or higher than a predetermined value or if user-provided data is registered by a predetermined registrant (for example, a registrant who registered user-provided data with a high reliability score). This setup information should be entered by the user via the input device 61 of the navigation device 60 and stored in the auxiliary storage unit 740. The control unit 710 references this setup information before outputting a warning message.

If the reliability score of user-provided data is not increased (the usage frequency of user-provided data is not improved) within a predetermined time after the user-provided data is registered, the navigation information distribution server 10 may delete the user-provided data from the user-provided data DB unit 270. Deleting such user-provided data improves the utilization of the storage capacity of the navigation information storage unit 200.

The navigation information distribution server 10 in this embodiment can be implemented by a navigation information distribution program that executes the processing described above. The navigation device 60 can be implemented by a navigation program that executes the processing described above. Those programs can be stored on a computer readable storage medium (CD-ROM) for distribution. Those programs can also be provided via a network.

Although the navigation device 60 is mounted primarily in a vehicle in the description of the embodiment described above, the navigation device 60 can be of course built in a terminal, such as a mobile phone or a PDA, that has the communication function.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A navigation device including a display device, an input device, and a control unit for performing navigation processing, said navigation device comprising:

a communication unit adapted to communicate with a server device;

a navigation information storage unit adapted to store navigation information therein, said navigation device adapted to receive a list of user-provided data with corresponding reliability scores from the server device and download, from the server device, user-provided data selected from the list of user-provided data into the navigation information storage unit so that a driving history of a user's vehicle is collected by the server device to create the user-provided data to be used for a route search as part of navigation information based on the driving history of the user's vehicle, the user-provided data comprising coordinate information obtained from the driving history of the user's vehicle and link cost with respect to the coordinate information used for the route search, a reliability score calculated based on the usage result of other users being provided for each user-provided datum; and a human machine interface unit that displays the user-provided data and navigation information other than the user-provided data read from said navigation information storage unit;

wherein the navigation device performs navigation processing in accordance with map data and the user-provided data.

2. The navigation device according to claim 1 wherein the user-provided data is a driving history indicating a driving coordinate string of the user's vehicle, POI (Point Of Interest) information including position coordinates of a POI and a name of the POI, and information including guide information for guiding the vehicle to a POI.

3. The navigation device according to claim 1 wherein the navigation processing is to display map information including navigation information read from said navigation information storage unit, to set a destination of navigation based on the map information, to calculate a route to the destination that is set, and to display route guide information on the calculated route on said display device.

4. The navigation device according to claim 3, wherein, when an instruction to download the user-provided data is received via said input unit, said control unit displays a warning message, read from said navigation information storage unit, and screen information prompting for an input for selecting whether to download the user-provided data from said server device on said display device and, when a selection input requesting to download the user-provided data from said server device is received via said input device, said control device downloads the navigation information from said server device via said communication unit.

5. A navigation method for use by a navigation device including a display device, an input device, a navigation information storage unit, in which navigation information is stored, a control unit that performs navigation processing based on the navigation information, and a communication unit that communicates with a server device, said navigation method comprising the steps of:

receiving a list of user-provided data with corresponding reliability scores from the server device, a driving history of a user's vehicle being collected by the server device to create the user-provided data to be used for a route search as part of navigation information, the user-provided data comprising coordinate information obtained from the driving history of the user's vehicle and link cost with respect to the coordinate information used for the route search, the reliability score calculated based on the usage result of other users being provided for each datum of the user-provided data;

downloading user-provided data selected from the list of user-provided data from the server device; and performing navigation processing in accordance with map data and the user-provided data stored in the navigation information storage unit.

6. The navigation method according to claim 5, wherein said navigation method further comprises:

receiving, via said input device, an instruction to download the user-provided data from said server device;

displaying a warning message, read from said navigation information storage unit, and screen information prompting for an input for selecting whether to download the user-provided data from said server device on said display device; and when a selection input requesting to download the user-provided data from said server device is received via said input device, downloading the navigation information from said server device via said communication unit.

7. A server device comprising:

an input/output unit for inputting and outputting various types of data;

a driving history storage unit in which the driving history of a user's vehicle, received via said input/output unit, is stored;

a navigation information storage unit in which navigation information, including user-provided data, is stored;

a navigation information generation unit for creating the user-provided data to be used for a route search as part of navigation information based on driving history of the user's vehicle, the user-provided data being map information including coordinate information obtained from the driving history of the user's vehicle and link cost with respect to the coordinate information used for the route search, the server device calculating a reliability score of the user-provided data based on a usage result of the user-provided data by other users;

a navigation information search unit that, in response to a navigation information acquisition request from the navigation device via said input/output unit, searches said navigation information storage unit for navigation information specified by the acquisition request;

a navigation information request processing unit that, if the user-provided data is included in the navigation information that has been searched for, sends a list of user-provided data, with corresponding reliability scores, to said navigation device; and a navigation information download management unit that sends the user-provided data to said navigation device when a request to download the user-provided data is received from said navigation device.

8. The server device according to claim 7 wherein said input/output unit receives the driving history of the vehicle, including an ID (identification) of the navigation information, from the navigation device that records the ID of navigation information used for navigation processing for user's vehicle, and further comprising a reliability score management unit that, with an ID of navigation information, included in the received driving history as a key, searches said navigation information storage unit for user-provided data having the ID for updating a value of the reliability score of the user-provided data that has been searched for.

9. A navigation information distribution system comprising a navigation device and a server device, wherein said navigation device comprises:

a communication unit adapted to communicate with a server device; and a navigation information storage unit adapted to store navigation information therein;

the navigation device being adapted to receive a list of user-provided data with corresponding reliability scores from the server device, and download from the server device user-provided data selected from the list of user-provided data into the navigation information storage unit, so that a driving history of a user's vehicle is collected by the server device to create the user-provided data to be used for a route search as a part of navigation information based on the driving history of the user's vehicle, the user-provided data comprising coordinate information obtained from the driving history of the user's vehicle and link cost with respect to the coordinate information used for the route search, a reliability score calculated based on the usage result of other users being provided for each datum of user-provided data; and wherein said server device comprises:

an input/output unit for inputting and outputting various types of data;

a driving history storage unit in which the driving history of a user's vehicle, received via said input/output unit, is stored;

a navigation information storage unit in which navigation information, including user-provided data, is stored;

a navigation information generation unit for creating the user-provided data based on driving history of a user's vehicle;

a navigation information search unit that, in response to a navigation information acquisition request from the navigation device via said input/output unit, searches said navigation information storage unit for navigation information specified by the acquisition request;

a navigation information request processing unit that, if the user-provided data is included in the navigation information that has been searched for, sends a list of user-provided data, with corresponding reliability scores, to said navigation device; and a navigation information download management unit that sends the user-provided data selected by a user to said navigation device when a request to download the user-provided data is received from said navigation device.

* * * * *